US010233935B2

(12) United States Patent
Kanai et al.

(10) Patent No.: US 10,233,935 B2
(45) Date of Patent: Mar. 19, 2019

(54) MOTOR, AND MOTOR CONTROL SYSTEM

(71) Applicant: Nidec Copal Electronics Corporation, Tokyo (JP)

(72) Inventors: Takashi Kanai, Saitama (JP); Hiroki Matsushita, Saitama (JP)

(73) Assignee: Nidec Copal Electronics Corporation, Tokyo (JP)

( * ) Notice: Subject to any disclaimer, the term of this patent is extended or adjusted under 35 U.S.C. 154(b) by 180 days.

(21) Appl. No.: 15/528,608

(22) PCT Filed: Feb. 15, 2016

(86) PCT No.: PCT/JP2016/054241
§ 371 (c)(1),
(2) Date: May 22, 2017

(87) PCT Pub. No.: WO2016/136512
PCT Pub. Date: Sep. 1, 2016

(65) Prior Publication Data
US 2017/0268524 A1 Sep. 21, 2017

(30) Foreign Application Priority Data

Feb. 24, 2016 (JP) ................................. 2015-034390

(51) Int. Cl.
*F04D 29/05* (2006.01)
*F04D 29/056* (2006.01)
(Continued)

(52) U.S. Cl.
CPC ............. *F04D 29/05* (2013.01); *F04D 25/08* (2013.01); *F04D 27/001* (2013.01);
(Continued)

(58) Field of Classification Search
CPC ...... F04D 29/05; F04D 29/281; F04D 27/001; F04D 29/059; F04D 29/051; F04D 25/08;
(Continued)

(56) References Cited

U.S. PATENT DOCUMENTS 4,805,972 A * 2/1989 Tanaka ................. F16C 17/026
310/90
5,746,515 A * 5/1998 Takahashi ............ F16C 17/026
384/115
(Continued)

FOREIGN PATENT DOCUMENTS

JP 49-64749 A 6/1974
JP 61-189315 A 8/1986
(Continued)

*Primary Examiner* — Mohamad A Musleh
(74) *Attorney, Agent, or Firm* — Howson & Howson LLP

(57) ABSTRACT

This invention prevents seizure of a dynamic pressure gas bearing caused upon swinging contact between a motor shaft and a sleeve and an increase in contact friction torque. It also detects rotation of auxiliary bearings. A motor includes auxiliary bearings in series with a dynamic pressure gas bearing, and a non-contact detent torque generation mechanism parallel to the auxiliary bearings suppresses rotation of the auxiliary bearings. Where Ta denotes rotation-time viscous friction torque of the dynamic pressure gas bearing, Tka denotes contact friction torque possibly causing damage to the dynamic pressure gas bearing, Tb denotes rotation friction torque of the auxiliary bearings, and $Td_{max}$ denotes maximum torque generated when rotation of the auxiliary bearings is suppressed by the non-contact detent torque generation mechanism, $(Ta+Tka)>(Tb+Td_{max})>(Ta)$, and the rotation detecting means detects the rotation of the auxiliary bearings.

20 Claims, 18 Drawing Sheets

(51) Int. Cl.
| | |
|---|---|
| *H02K 7/08* | (2006.01) |
| *F16C 41/02* | (2006.01) |
| *F04D 25/08* | (2006.01) |
| *F04D 27/00* | (2006.01) |
| *F04D 29/051* | (2006.01) |
| *F04D 29/059* | (2006.01) |
| *F04D 29/28* | (2006.01) |
| *F16C 19/54* | (2006.01) |
| *F16C 32/06* | (2006.01) |
| *H02K 7/14* | (2006.01) |
| *H02P 29/00* | (2016.01) |

(52) U.S. Cl.
CPC ......... *F04D 29/051* (2013.01); *F04D 29/056* (2013.01); *F04D 29/059* (2013.01); *F04D 29/281* (2013.01); *F16C 19/54* (2013.01); *F16C 32/0614* (2013.01); *F16C 41/02* (2013.01); *H02K 7/08* (2013.01); *H02K 7/083* (2013.01); *H02K 7/14* (2013.01); *H02K 2213/06* (2013.01); *H02P 29/00* (2013.01)

(58) Field of Classification Search
CPC .... F04D 29/056; F16C 41/02; F16C 32/0614; F16C 19/54; H02K 7/14; H02K 7/083; H02K 7/08; H02K 2213/06; H02P 29/00
See application file for complete search history.

(56) References Cited

U.S. PATENT DOCUMENTS

| | | | |
|---|---|---|---|
| 5,751,085 A | * | 5/1998 | Hayashi ................ F16C 17/045 310/90 |
| 6,418,927 B1 | | 7/2002 | Kullik |
| 2007/0104593 A1 | | 5/2007 | Yamaguchi |

FOREIGN PATENT DOCUMENTS

| | | |
|---|---|---|
| JP | 61-252916 A | 11/1986 |
| JP | 9-238441 A | 9/1997 |
| JP | 2001-45700 A | 2/2001 |
| JP | 2002-5172 A | 1/2002 |
| WO | 2016017364 A1 | 2/2016 |

* cited by examiner

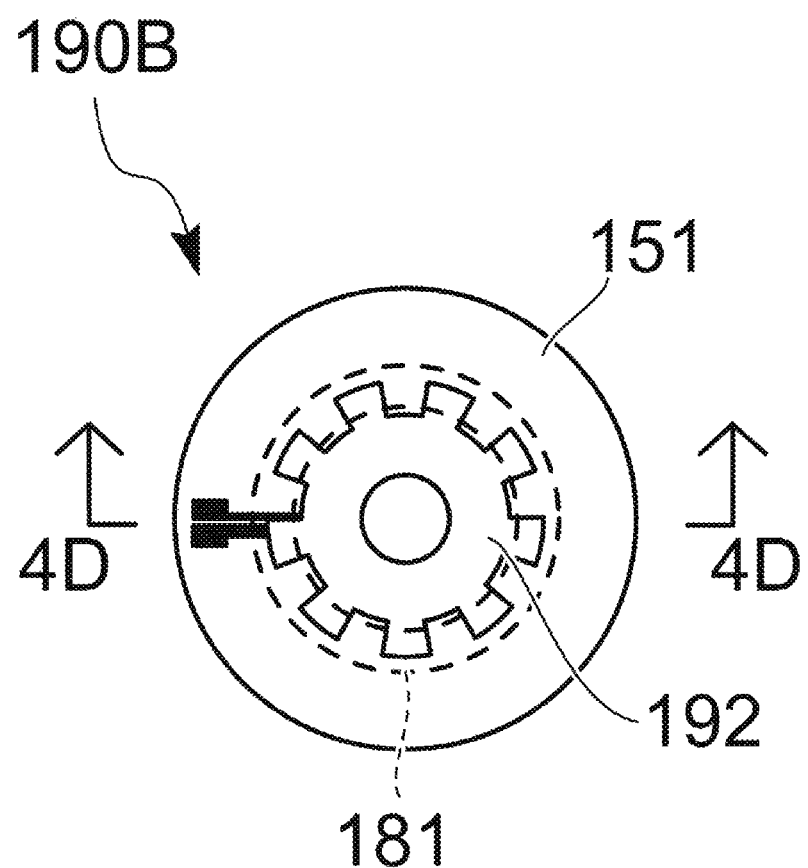

FIG.4D
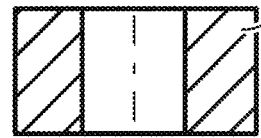

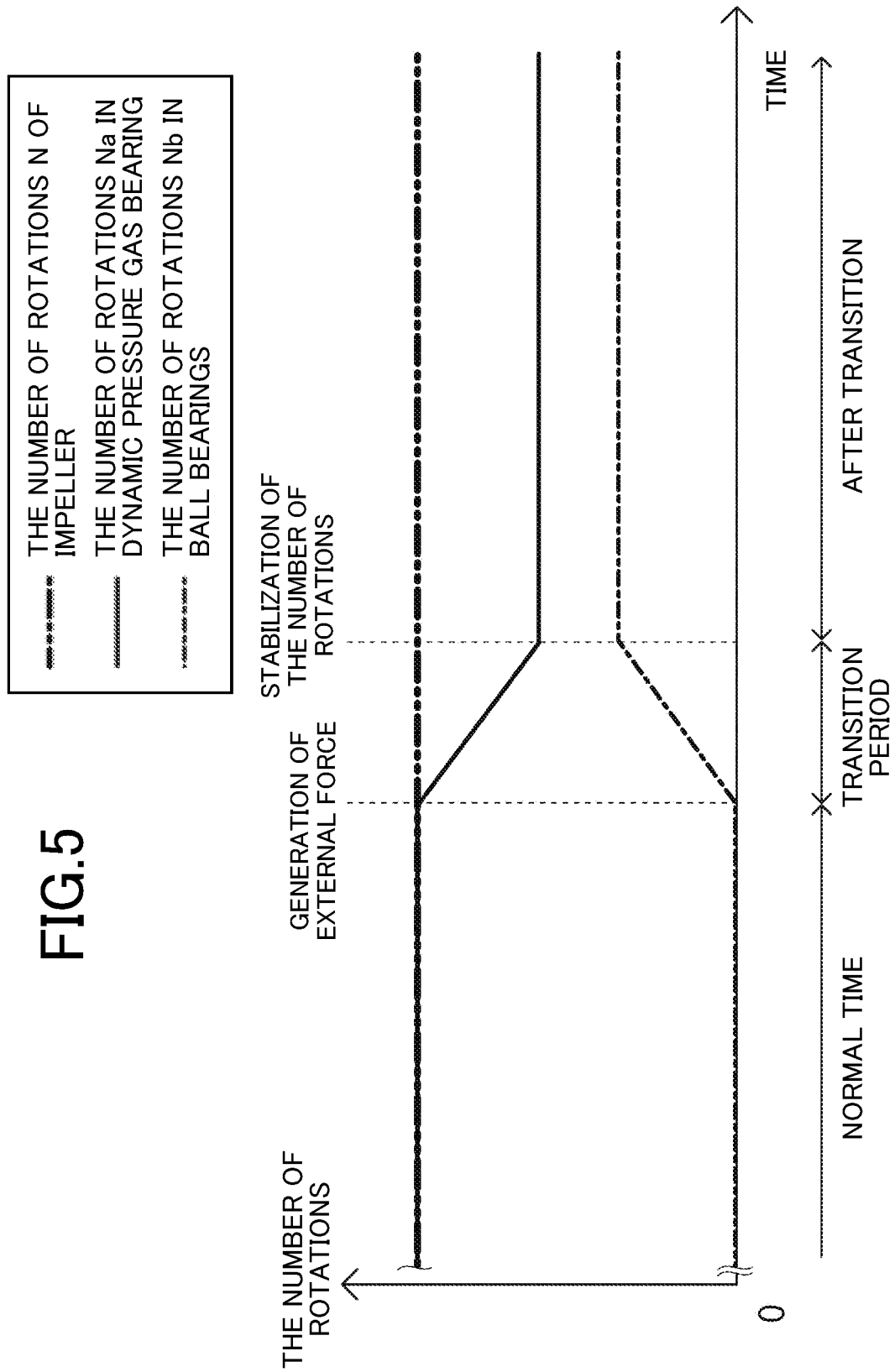

MOTOR, AND MOTOR CONTROL SYSTEM

FIELD OF THE INVENTION

The present invention relates to a motor including a dynamic pressure gas bearing, in which a rotating body is rotated at high speed, and in particular, relates to a motor used in a fan instrument called a sirocco fan, a turbo blower, or the like, and a motor control system including this motor.

BACKGROUND OF THE INVENTION

Conventionally, there is a known motor in which a dynamic pressure gas bearing supporting a shaft by a sleeve is used. Such a motor is disclosed in Japanese Unexamined Utility Model Application Publication No. 03-101154.

However, the above conventional motor has a structure in which simply by rotating the shaft, a dynamic pressure is generated between an outer circumferential surface of the shaft and an inner circumferential surface of the sleeve, so that bearing rigidity is provided. Thus, when, due to an external disturbance or the like added to the motor, the shaft and the sleeve swing relatively in the direction in which the rotation axis of a rotating body is inclined and are brought into contact with each other, a contact friction torque of the dynamic pressure gas bearing is increased, and seizure is generated by adhesion or galling of the dynamic pressure gas bearing. Thus, fatal damage could possibly be made to the dynamic pressure gas bearing.

Therefore, in order to sustain the rotation safely, there is another known motor including a sliding bearing, a rolling bearing provided on the outer side of this sliding bearing, and a rotation regulating means that regulates rotation of the rolling bearing until a rotation torque transmitted from the sliding bearing to the rolling bearing becomes or exceeds a reference rotation torque. This motor is described in Japanese Examined Utility Model Application Publication No. 57-1132.

However, the above conventional rotation regulating means has a contact structure in which an elastic member and a coupling member, which are attached to an outer annular member, are abutted with an inner annular member. Thus, there is a problem that even when the transmitted rotation torque exceeds the reference rotation torque but the rotation is made by the rolling bearing, the elastic member is abutted at each rotation and the elastic member is damaged, or a problem that when the transmitted rotation torque exceeds the reference rotation torque, the coupling member is broken and the structure itself of the rotation regulating means is damaged.

SUMMARY OF INVENTION

Therefore, the present invention is to address the above problems of the conventional techniques. That is, an object of the present invention is to provide a motor capable of preventing seizure generated by adhesion or galling of a dynamic pressure gas bearing which is caused upon swinging contact between a motor shaft and a sleeve due to an external disturbance added to the motor and an increase in a contact friction torque of the dynamic pressure gas bearing, to make the total number of rotations of a rotating body with respect to a motor case body substantially constant before and after generation of the swinging contact without destructing the structure and to detect rotation of auxiliary bearings, and a motor control system.

In order to address the above-described problems, a first aspect of the present invention is a motor including a motor case body, a motor shaft supported rotatably with respect to the motor case body, a drive coil arranged in the motor case body, the drive coil that generates a magnetic force via energization, a rotor magnet that generates a rotational force by utilizing an attraction/repulsion force acting between the drive coil and the rotor magnet, and a dynamic pressure gas bearing having a sleeve which covers a circumference of the motor shaft, the motor further including auxiliary bearings arranged in series with the dynamic pressure gas bearing, the auxiliary bearings rotatably supporting the motor shaft, and a non-contact detent torque generation mechanism arranged in parallel to the auxiliary bearings, the non-contact detent torque generation mechanism that suppresses rotation of the auxiliary bearings, wherein when Ta denotes a rotation-time viscous friction torque of the dynamic pressure gas bearing in a state where the motor shaft and the sleeve are separated from each other, Tka denotes a contact friction torque possibly making damage to the dynamic pressure gas bearing by swinging contact between the motor shaft and the sleeve, Tb denotes a rotation friction torque of the auxiliary bearings, and $Td_{max}$ denotes a maximum torque generated in a state where the rotation of the auxiliary bearings is suppressed by the non-contact detent torque generation mechanism, the value of $Td_{max}$ is set to obtain the following relationship:

$$(Ta+Tka)>(Tb+Td_{max})>(Ta), \text{ and}$$

a rotation detecting means that detects the rotation of the auxiliary bearings is provided.

A second aspect of the present invention further addresses the above-described problems by providing the motor according to the first aspect, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction.

A third aspect of the present invention further addresses the above-described problems by providing the motor according to the first or second aspect, wherein the auxiliary bearings are rolling bearings.

In order to address the above-described problems, a fourth aspect of the present invention is a motor control system including a motor, and a control unit that controls rotation of the motor, the motor control system for controlling the motor, wherein the motor is the motor according to any one of the first to third aspects, and the control unit receives a rotation detection signal from the rotation detecting means.

A fifth aspect of the present invention further addresses the above-described problems by providing the motor control system according to the fourth aspect, wherein when receiving the rotation detection signal, the control unit issues a notification command to a notification means.

A sixth aspect of the present invention further addresses the above-described problems by providing the motor control system according to the fourth or fifth aspect, wherein when receiving the rotation detection signal, the control unit measures a rotation addition time of the auxiliary bearings.

A seventh aspect of the present invention further addresses the above-described problems by providing the motor control system according to any one of the fourth to sixth aspects, wherein the control unit counts up the number of times the rotation detection signal is received.

An eighth aspect of the present invention further addresses the above-described problems by providing the motor control system according to any one of the fourth to seventh aspects, wherein the control unit reduces the number of rotations of the motor after receiving the rotation detection signal until the rotation detection signal is not received any more, and increases the number of rotations of the motor after the rotation detection signal is not received any more, to restore the number of rotations into a state where the rotation of the auxiliary bearings is suppressed.

The motor of the present invention includes the motor case body, the motor shaft supported rotatably with respect to this motor case body, the drive coil arranged in the motor case body, the drive coil that generates the magnetic force via energization, the rotor magnet that generates the rotational force by utilizing the attraction/repulsion force acting between this drive coil and the rotor magnet, and the dynamic pressure gas bearing having the sleeve which covers the circumference of the motor shaft. Thereby, not only at least one of the motor shaft and the sleeve can be rotated at high speed as a rotating body but also the following peculiar effects can be exerted.

According to the motor of the first aspect, the motor includes the auxiliary bearings arranged in series with the dynamic pressure gas bearing, the auxiliary bearings rotatably supporting the motor shaft, and the non-contact detent torque generation mechanism arranged in parallel to the auxiliary bearings, the non-contact detent torque generation mechanism that suppresses the rotation of the auxiliary bearings, wherein when Ta denotes the rotation-time viscous friction torque of the dynamic pressure gas bearing in a state where the motor shaft and the sleeve are separated from each other, Tka denotes the contact friction torque possibly making damage to the dynamic pressure gas bearing by the swinging contact between the motor shaft and the sleeve, Tb denotes the rotation friction torque of the auxiliary bearings, and $Td_{max}$ denotes the maximum torque generated in a state where the rotation of the auxiliary bearings is suppressed by the non-contact detent torque generation mechanism, the value of $Td_{max}$ is set to obtain the following relationship: $(Ta+Tka)>(Tb+Td_{max})>(Ta)$, and the rotation detecting means that detects the rotation of the auxiliary bearings is provided. Thereby, when, due to an external disturbance or the like added to the motor, the motor shaft and the sleeve are brought into swinging contact with each other, the rotation of the auxiliary bearings is started before seizure such as adhesion or galling is generated in the dynamic pressure gas bearing. Thus, without making fatal damage to the dynamic pressure gas bearing, the total number of rotations of the rotating body with respect to the motor case body can be made substantially constant without a change before and after the generation of the swinging contact. Further, the detent torque generation mechanism is of a non-contact type. Thus, even in a case where the rotation of the auxiliary bearings is started, the rotation can be continued without destructing the structure of the detent torque generation mechanism. By providing the rotation detecting means that detects the rotation of the auxiliary bearings, even in a case where the rotation of the auxiliary bearings is started, the rotation of the auxiliary bearings can be detected in real-time.

According to the motor of the second aspect, in addition to the effects exerted by the first aspect, the non-contact detent torque generation mechanism includes the rotation-side magnet to be rotated integrally with the motor shaft, the rotation-side magnet whose poles are switched in the circumferential direction, and the fixed-side magnet arranged to face the rotation-side magnet on the outer circumferential side of the rotation-side magnet or in the axial direction of the rotation-side magnet, the fixed-side magnet whose poles are switched in the circumferential direction. Thereby, before the rotation of the auxiliary bearings is started, the maximum attraction force acting between the rotation-side magnet and the fixed-side magnet is the maximum torque of a detent torque generated at the time of suppressing the rotation of the auxiliary bearings. Meanwhile, a detent torque of the time when the auxiliary bearings are rotated is changed into a sinusoidal waveform in accordance with a relative angle between the rotation-side magnet and the fixed-side magnet, and the torque at a peak of the sinusoidal waveform is the maximum torque. On the other hand, an average torque of the time when the auxiliary bearings make one rotation is zero. Thus, when the auxiliary bearings are rotated, a substantive loss is not generated by the detent torque.

According to the motor of the third aspect, in addition to the effects exerted by the first or second aspect, the auxiliary bearings are rolling bearings. Thereby, with no radical deterioration, seizure is not easily generated. Thus, before the motor shaft and the sleeve are brought into swinging contact with each other due to the external disturbance or the like and fatal damage is made to the dynamic pressure gas bearing, the rotation of the auxiliary bearings can be surely and promptly started.

According to the motor control system of the fourth aspect, the motor is the motor according to any one of the first to third aspects, and the control unit receives the rotation detection signal from the rotation detecting means. Thereby, in addition to the effects exerted by any one of the first to third aspects, in a case where the rotation of the auxiliary bearings is started, the rotation of the auxiliary bearings can be detected. Thus, the control unit can grasp the rotation of the auxiliary bearings in real-time.

According to the motor control system of the fifth aspect, in addition to the effects exerted by the fourth aspect, when receiving the rotation detection signal, the control unit issues the notification command to the notification means. Thereby, in a case where the rotation of the auxiliary bearings is started, a user will be notified of the start, so that the user can be informed of the rotation of the auxiliary bearings. According to need, the user can be encouraged to replace the motor and the auxiliary bearings.

According to the motor control system of the sixth aspect, in addition to the effects exerted by the fourth or fifth aspect, when receiving the rotation detection signal, the control unit measures the rotation addition time of the auxiliary bearings. Thereby, the control unit can calculate and predict the life of the auxiliary bearings from the rotation addition time. For example, on the basis of this prediction of the life, the replacement of the motor and the auxiliary bearings can be encouraged.

According to the motor control system of the seventh aspect, in addition to the effects exerted by any one of the fourth to sixth aspects, the control unit counts up the number of times the rotation detection signal is received. Thereby, the number of times the rotation is started in the auxiliary bearings is counted up. Thus, the control unit can calculate and predict the life of the auxiliary bearings from the number of rotation start times. For example, on the basis of this prediction of the life, the replacement of the motor and the auxiliary bearings can be encouraged.

According to the motor control system of the eighth aspect, in addition to the effects exerted by any one of the fourth to seventh aspects, the control unit reduces the number of rotations of the motor after receiving the rotation detection signal until the rotation detection signal is not received any more. Thereby, the rotation of the auxiliary bearings is suppressed by the non-contact detent torque generation mechanism. By increasing the number of rotations of the motor again after the rotation detection signal is not received any more, a rotation state and the number of rotations can be restored into a state before the motor shaft and the sleeve are brought into swinging contact with each other. Thus, the life of the motor (bearing) can be made semi-permanent.

BRIEF DESCRIPTION OF THE DRAWINGS

FIG. 4C is a principle view illustrating a fluxgate pattern which serves as the rotation detecting means.

FIG. 4D is a principle view, taken on section plane 4D-4D of FIG. 4C, illustrating the fluxgate pattern which serves as the rotation detecting means.

FIG. 5 is a diagram illustrating a change in the number of rotations of the dynamic pressure gas bearing and a change in the number of rotations of the ball bearings before and after swinging contact between the motor shaft and the sleeve.

DETAILED DESCRIPTION OF THE PREFERRED EMBODIMENTS

Figure 1:
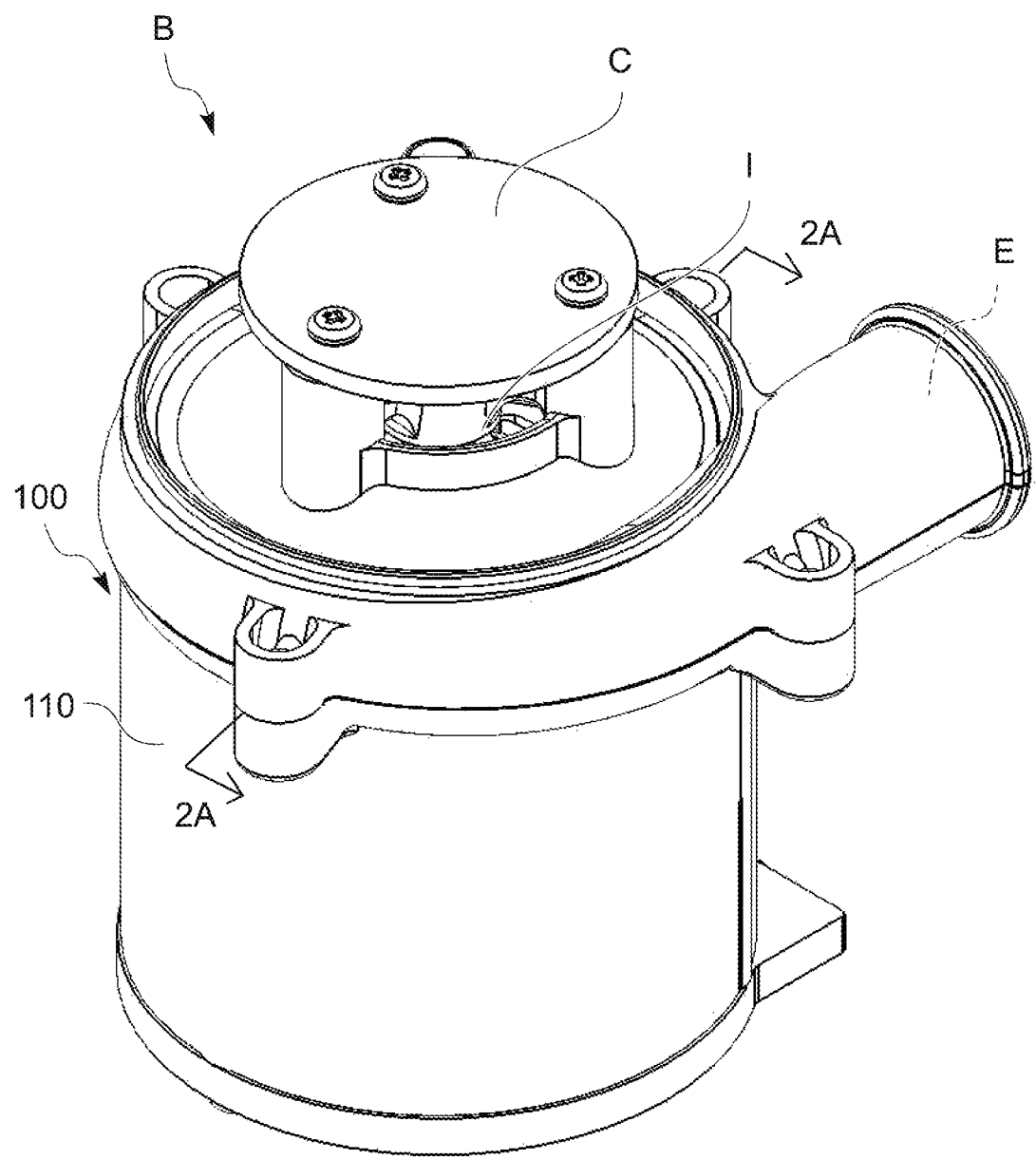
FIG. 1 is a perspective view of a fan instrument using a motor which serves as a first embodiment of the present invention.

Specific embodiments of the present invention can be anything as long as a motor includes a motor case body, a motor shaft supported rotatably with respect to the motor case body, a drive coil arranged in the motor case body, the drive coil that generates a magnetic force via energization, a rotor magnet that generates a rotational force by utilizing an attraction/repulsion force acting between the drive coil and the rotor magnet, and a dynamic pressure gas bearing having a sleeve which covers a circumference of the motor shaft, and also includes auxiliary bearings arranged in series with the dynamic pressure gas bearing, the auxiliary bearings rotatably supporting the motor shaft, and a non-contact detent torque generation mechanism arranged in parallel to the auxiliary bearings, the non-contact detent torque generation mechanism that suppresses this rotation of the auxiliary bearings, when Ta denotes a rotation-time viscous friction torque of the dynamic pressure gas bearing in a state where the motor shaft and the sleeve are separated from each other, Tka denotes a contact friction torque possibly making damage to the dynamic pressure gas bearing by swinging contact between the motor shaft and the sleeve, Tb denotes a rotation friction torque of the auxiliary bearings, and $Td_{max}$ denotes a maximum torque generated in a state where the rotation of the auxiliary bearings is suppressed by the non-contact detent torque generation mechanism, the value of $Td_{max}$ is set to obtain the following relationship:

$$(Ta+Tka) > (Tb+Td_{max}) > (Ta), \text{ and}$$

a rotation detecting means that detects the rotation of the auxiliary bearings is provided, thereby even in a case where, due to an external disturbance or the like added to the motor, the motor shaft and the sleeve are brought into swinging contact with each other and the contact friction torque of the dynamic pressure gas bearing is increased, the number of rotations of a rotating body with respect to the motor case body can be made substantially constant without a change before and after generation of the swinging contact, and even in a case where the rotation of the auxiliary bearings is started, the rotation can be continued without destructing the structure of the non-contact detent torque generation mechanism, and the rotation of the auxiliary bearings can be detected.

For example, the motor may be a so-called sleeve rotation-type motor in which not a motor shaft but a sleeve is rotated in a dynamic pressure gas bearing at the time of normal rotation before an external disturbance is added, or a so-called shaft rotation-type motor in which not a sleeve but a motor shaft is rotated. The motor may be any motor that is rotated at high speed, including a brushless DC motor (brushless direct-current motor) and an AC motor (alternating-current motor).

The auxiliary bearings may be other types of contact bearings, including a rolling bearing such as a ball bearing, a sliding bearing to be in plane or line contact, and a pivot bearing to be in nearly point contact.

The non-contact detent torque generation mechanism may be any type of non-contact detent torque generation mechanism, including one that generates a detent torque by using a magnetic force of permanent magnets and another one that generates a detent torque by using a magnetic force of electromagnets.

The rotation detecting means may be a magnetic sensor such as a sensor using a Hall sensor or a fluxgate pattern and an eddy current sensor, or an optical sensor using a CCD (Charge-Coupled Device), a photoreflector, or the like.

In a case where the magnetic sensor is used, by providing the sensor in the vicinity of the detent torque generation mechanism, the sensor can also be utilized as a magnetic force generation source for detecting rotation of the permanent magnet forming part of the detent torque generation mechanism, that is, the rotation-side magnet, and there is no need for providing a separate member. Thus, the magnetic sensor is desirable. However, the rotation detecting means is not necessarily provided in the case body.

In a case where the optical sensor is used in particular, the magnetic force of the detent torque generation mechanism is not utilized. Thus, irrespective of an arrangement place of the detent torque generation mechanism, the rotation position detecting means can be arranged appropriately.

Hereinafter, a fan instrument B using a motor 100 which serves as a first embodiment of the present invention will be described on the basis of FIGS. 1 to 6B, and a motor control system MS using the motor 100 will be described on the basis of FIGS. 7 to 11.

Figure 2A:
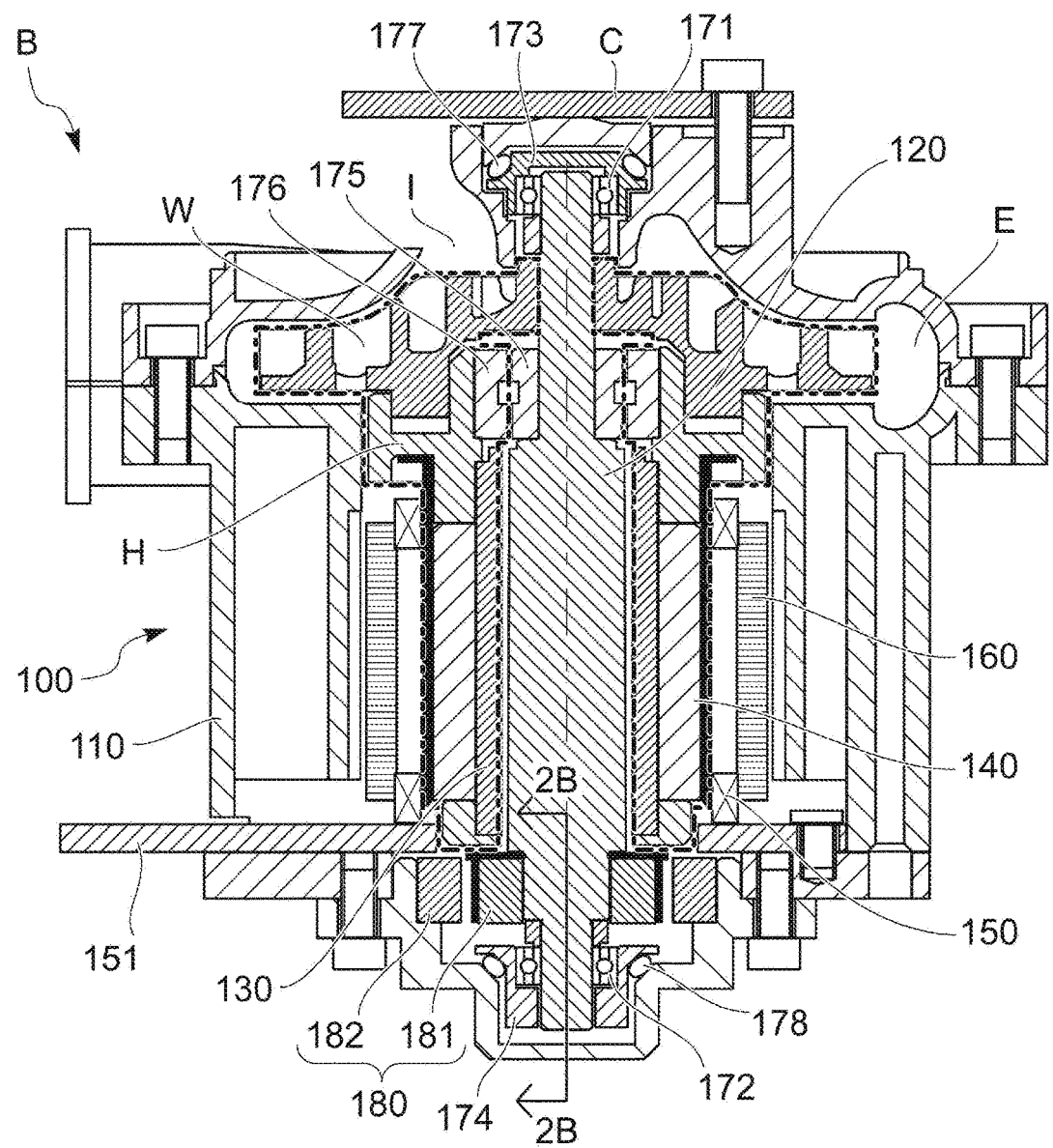
FIG. 2A is a sectional side view, as seen through section plane 2A-2A of FIG. 1, which illustrates rotation in a state where a motor shaft and a sleeve are separated from each other.
Figure 2B:
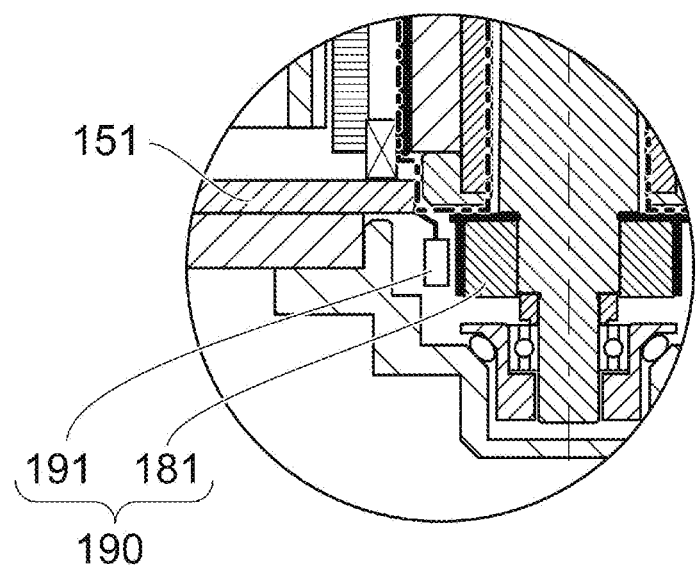
FIG. 2B is a sectional side view of major parts as seen through section plane 2B-2B of FIG. 2A.
Figure 3A:
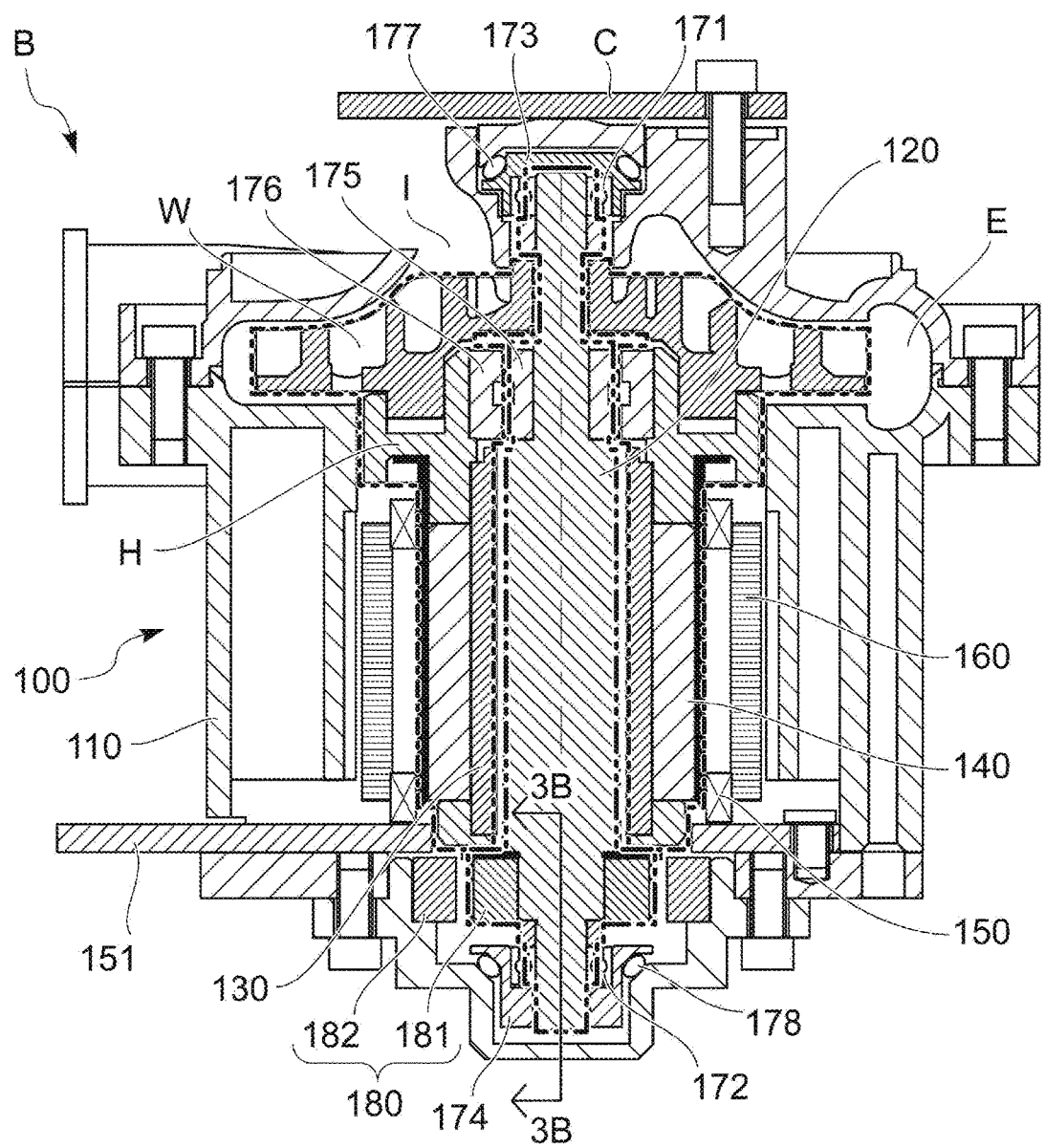
FIG. 3A is a sectional side view illustrating rotation of the time when the sum of a rotation-time viscous friction torque and a contact friction torque possibly making damage to a dynamic pressure gas bearing is a value greater than the sum of a friction torque of ball bearings and a maximum torque generated by a non-contact detent torque generation mechanism at the time of suppressing the rotation.
Figure 3B:
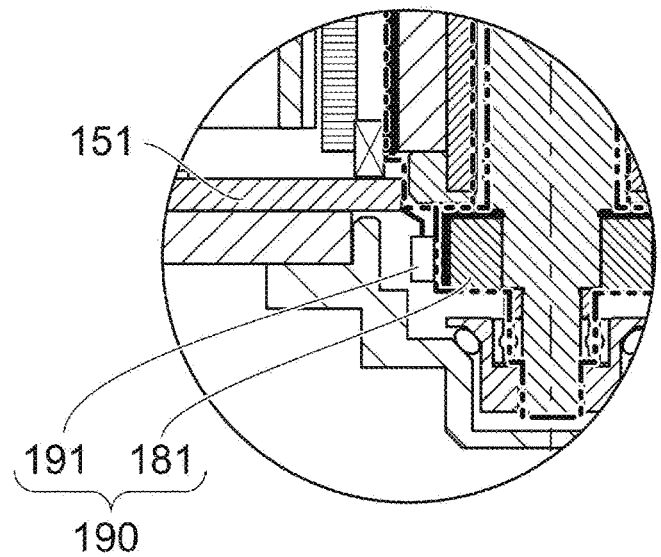
FIG. 3B is a sectional side view, taken on section plane 3B-3B in FIG. 3A, illustrating the rotation of the time when the sum of the rotation-time viscous friction torque and the contact friction torque possibly making damage to the dynamic pressure gas bearing is the value greater than the sum of the friction torque of the ball bearings and the maximum torque generated by the non-contact detent torque generation mechanism at the time of suppressing the rotation.
Figure 4A:
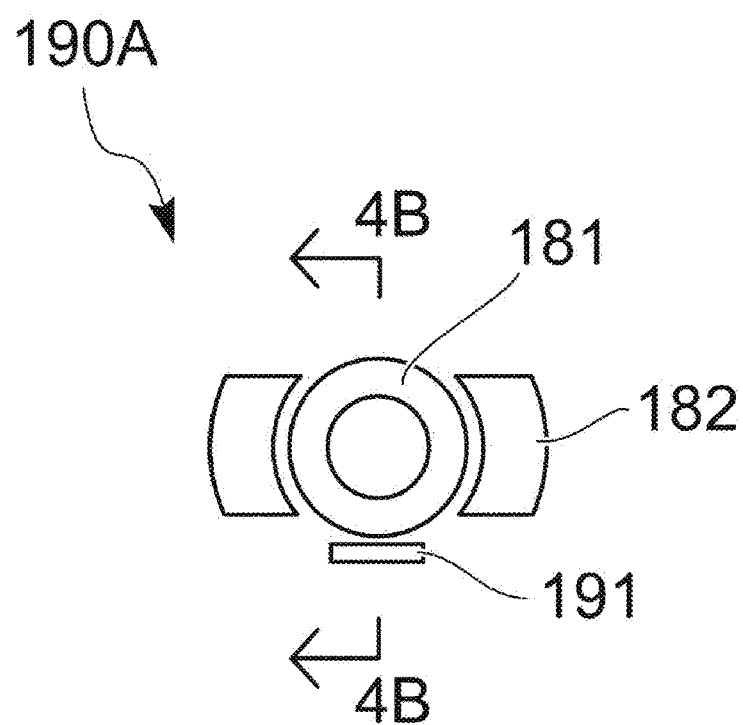
FIG. 4A is a principle view illustrating a Hall sensor which serves as a rotation detecting means.
Figure 4B:
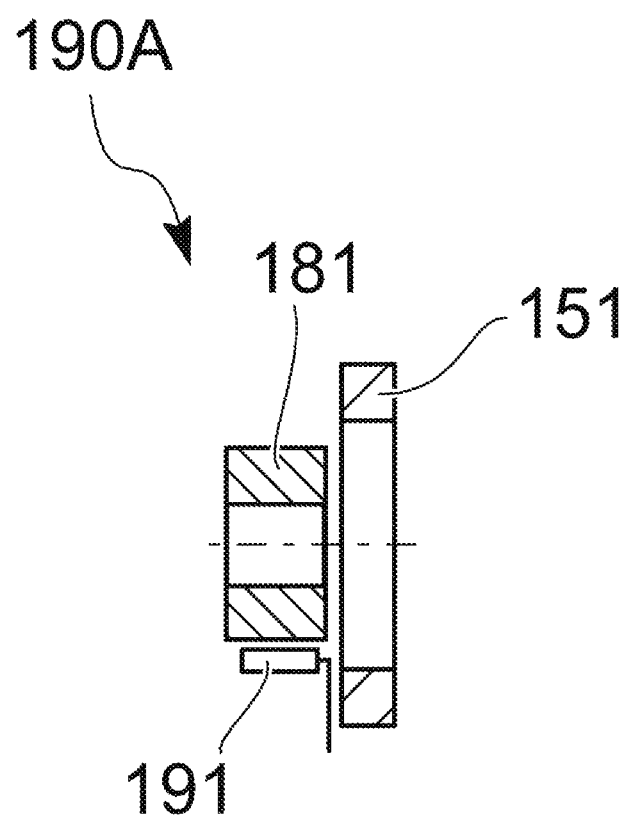
FIG. 4B is a principle view taken on section plane 4B-4B in FIG. 4A, further illustrating the Hall sensor which serves as the rotation detecting means.
Figure 4E:
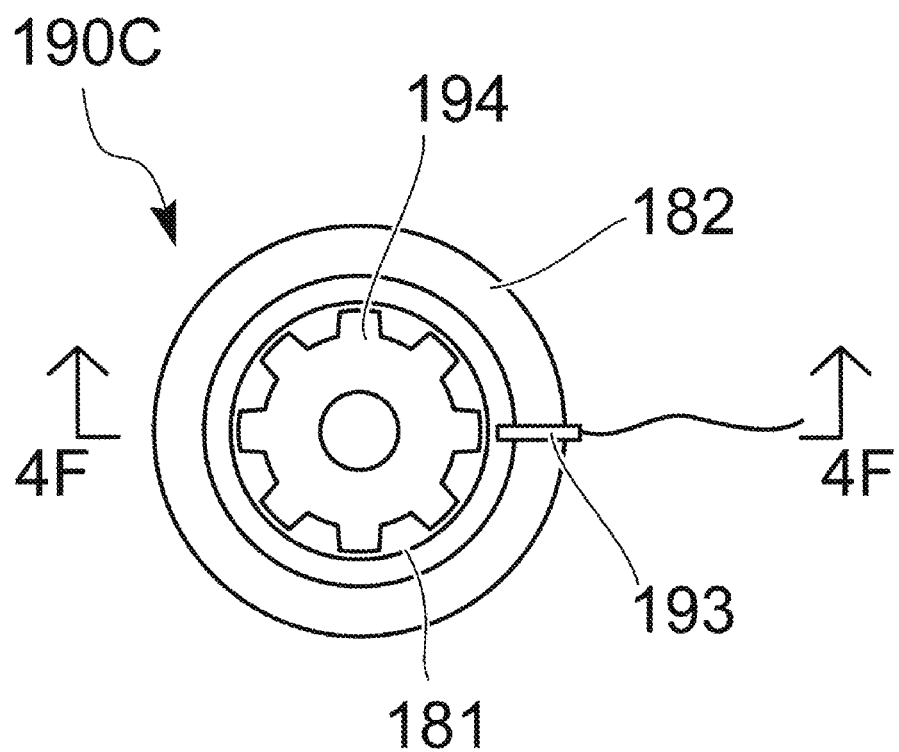
FIG. 4E is a principle view illustrating an eddy current sensor which serves as the rotation detecting means.
Figure 4F:
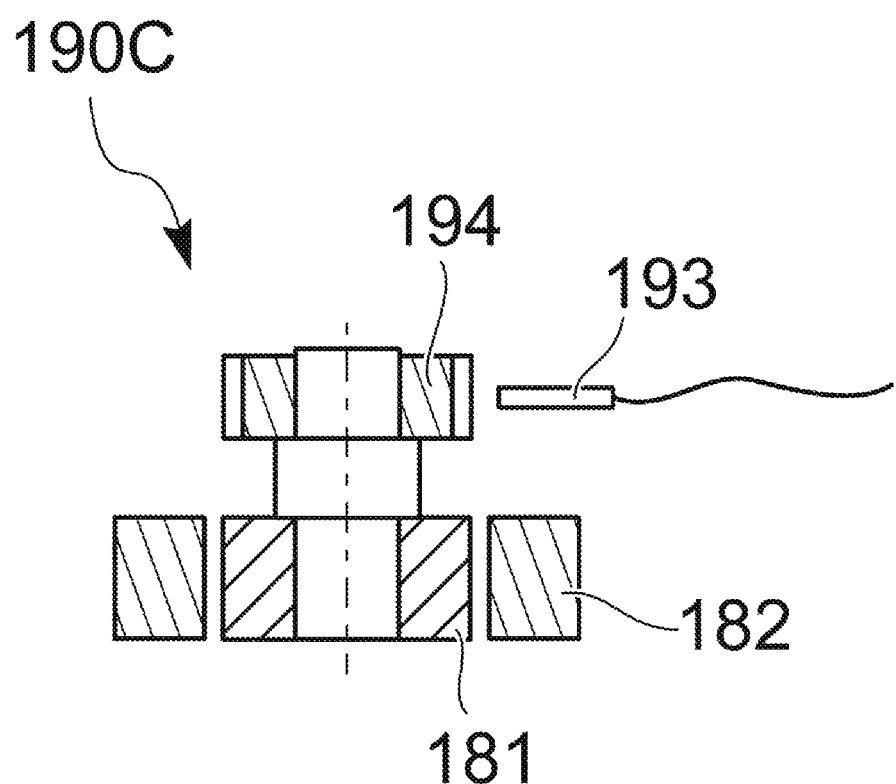
FIG. 4F is a principle view, taken on section plane 4F-4F of FIG. 4E, illustrating the eddy current sensor which serves as the rotation detecting means.
Figure 6A:
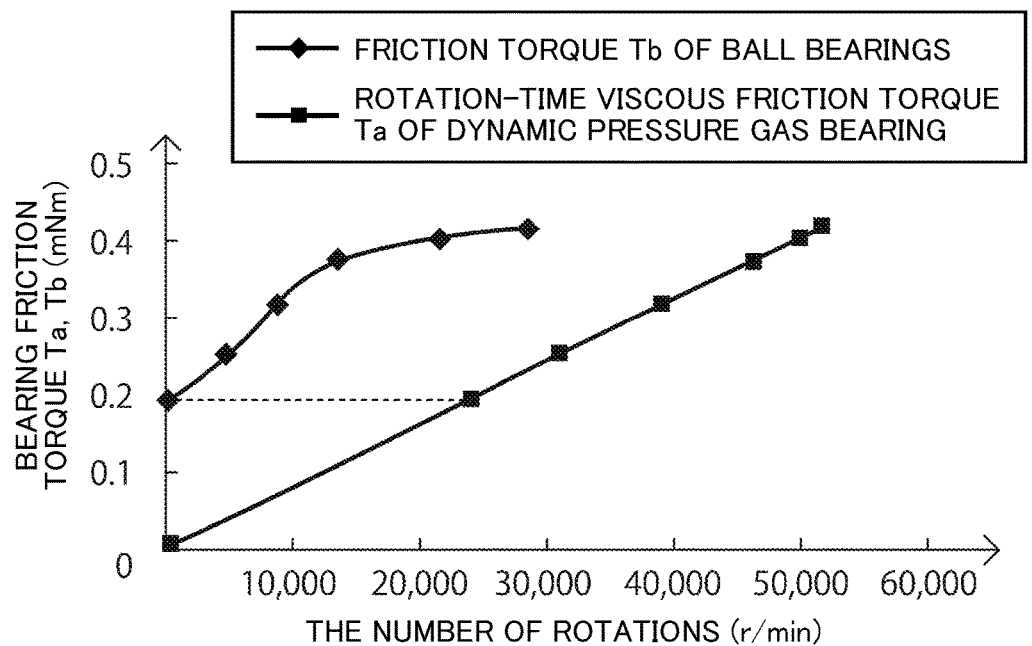
FIG. 6A is a diagram illustrating a relationship between the rotation-time viscous friction torque of the dynamic pressure gas bearing and the friction torque of the ball bearings, and the number of rotations.
Figure 6B:
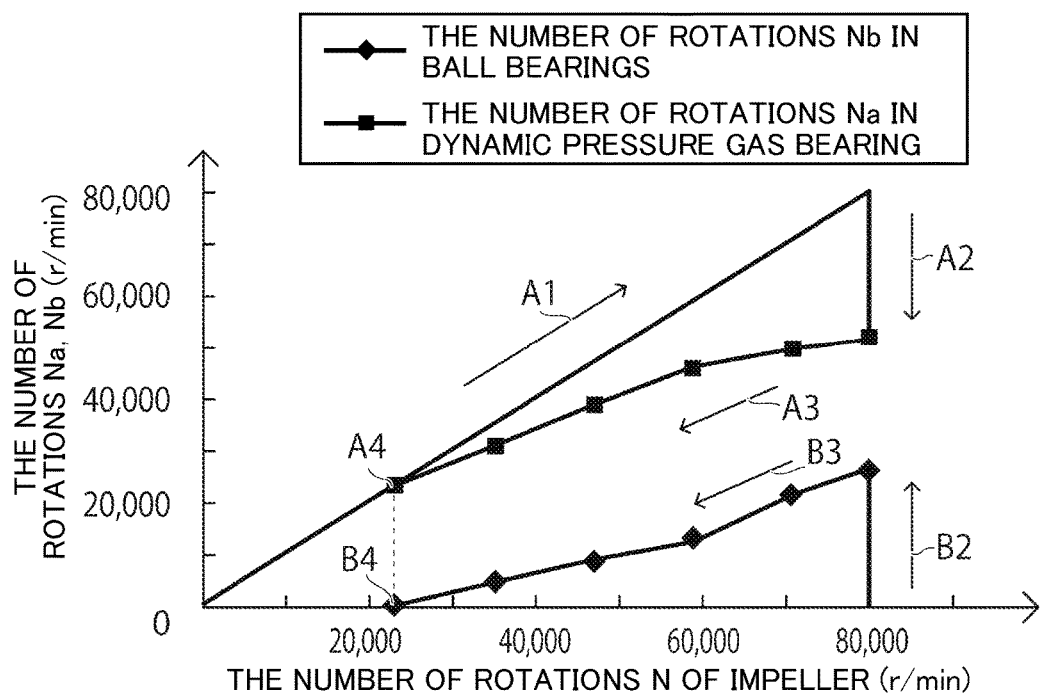
FIG. 6B is a diagram illustrating a relationship between the number of rotations of an impeller (motor), and the number of rotations of the dynamic pressure gas bearing and the number of rotations of the ball bearings.
Figure 7:
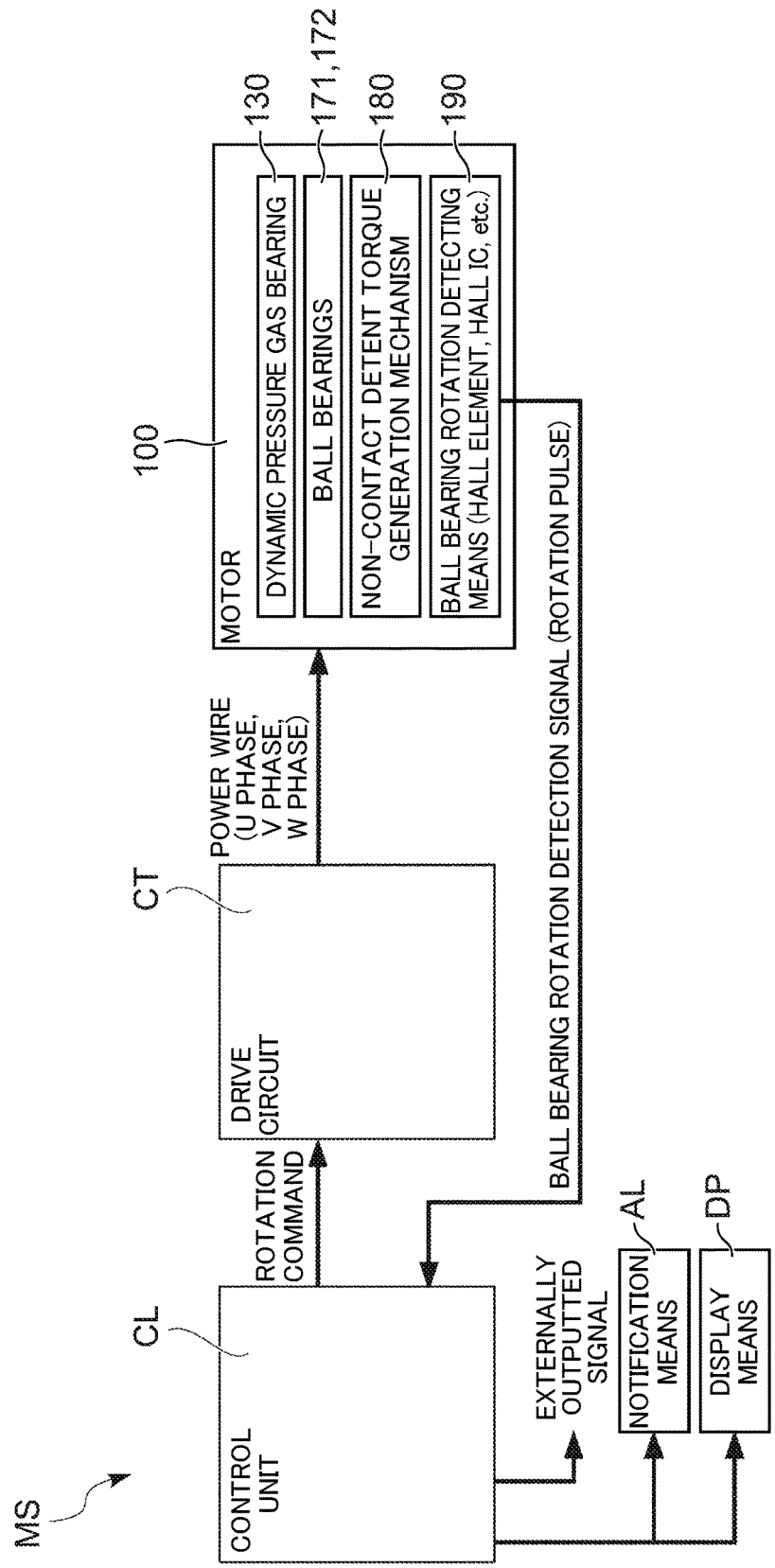
FIG. 7 is a schematic block diagram of a motor control system using the motor which serves as the first embodiment of the present invention.
Figure 8:
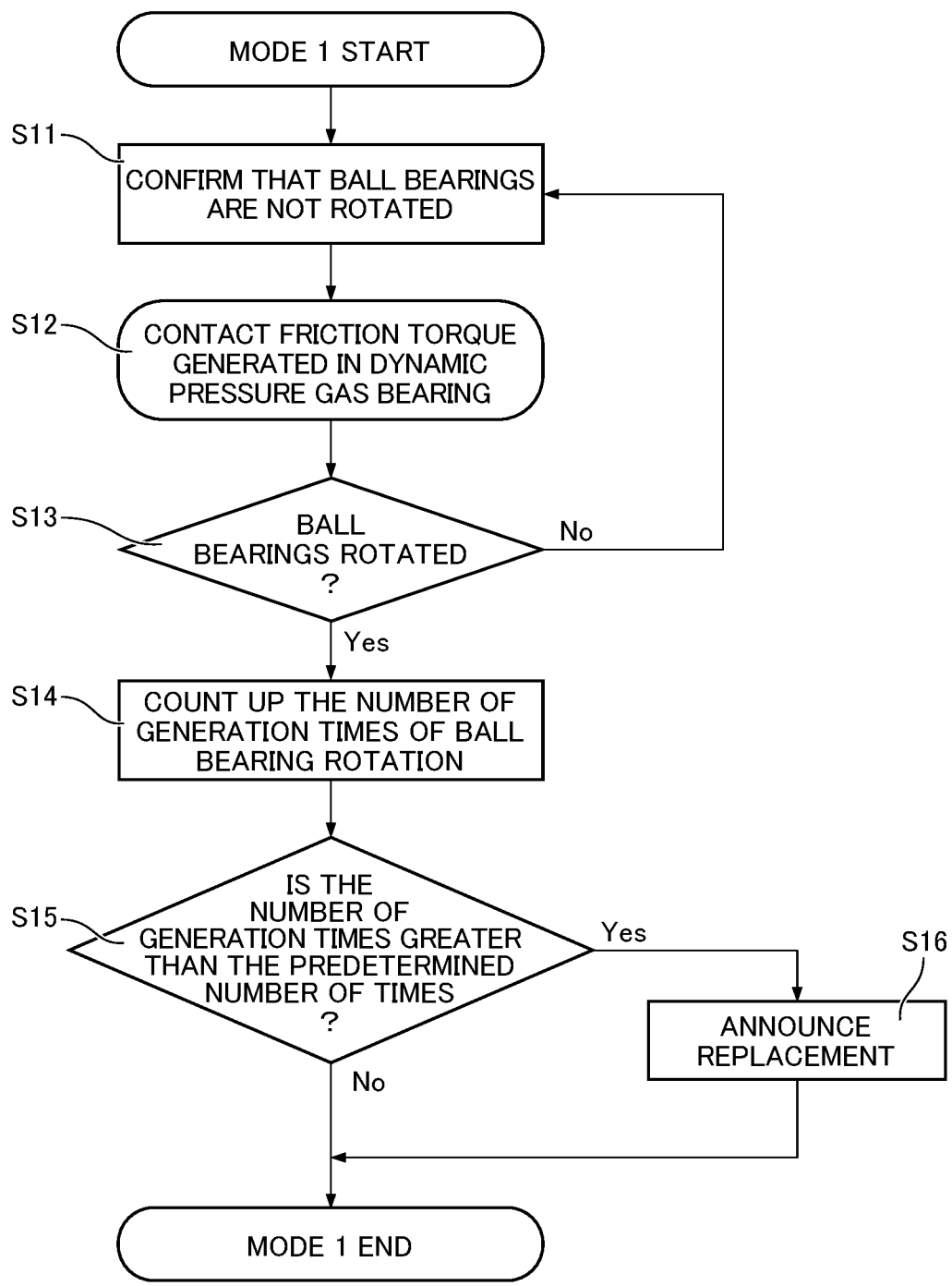
FIG. 8 is a flowchart illustrating a first mode of the motor control system.
Figure 9:
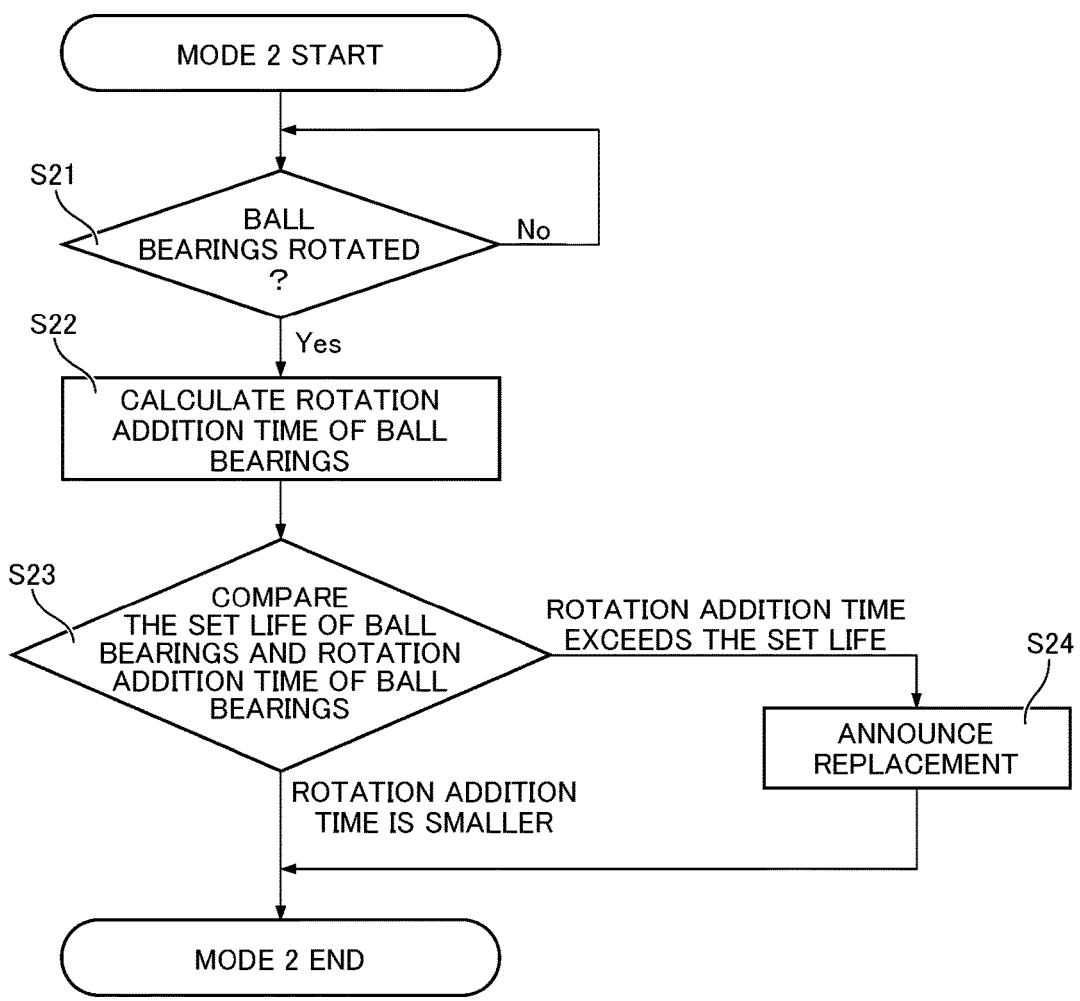
FIG. 9 is a flowchart illustrating a second mode of the motor control system.
Figure 10:
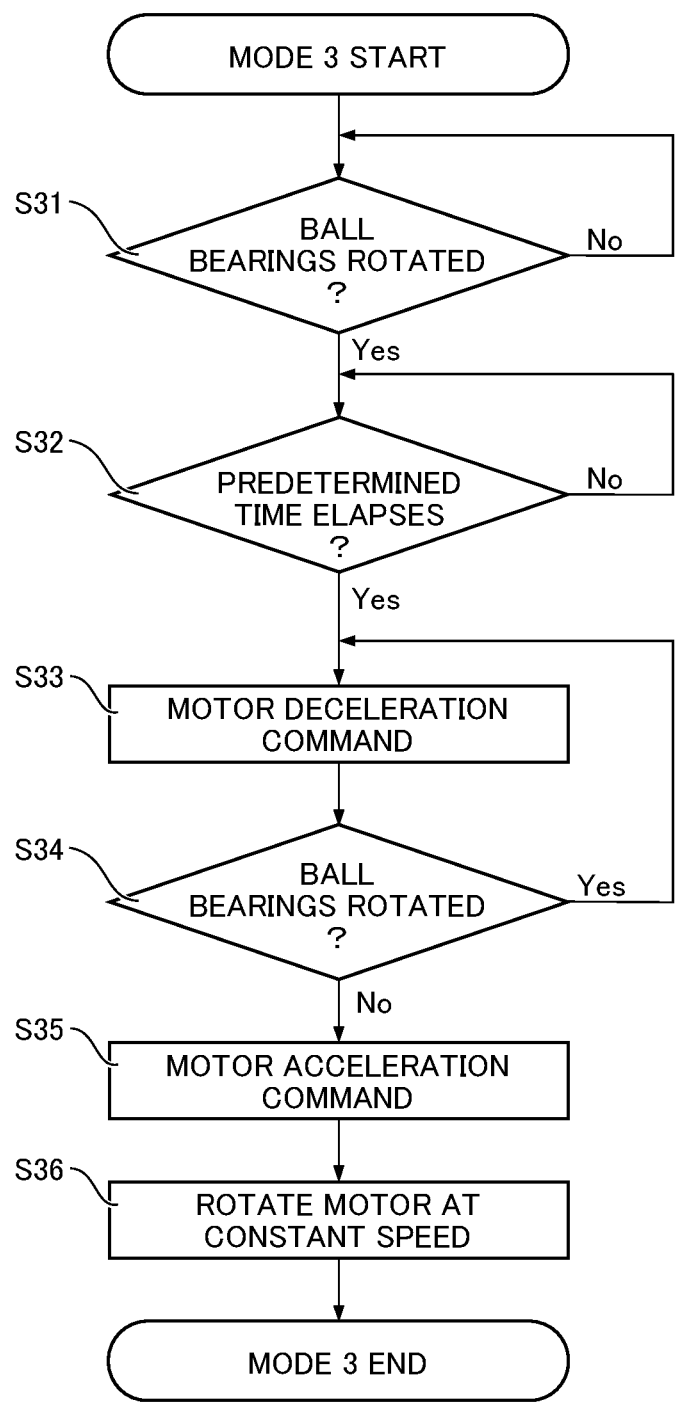
FIG. 10 is a flowchart illustrating a third mode of the motor control system.
Figure 11:
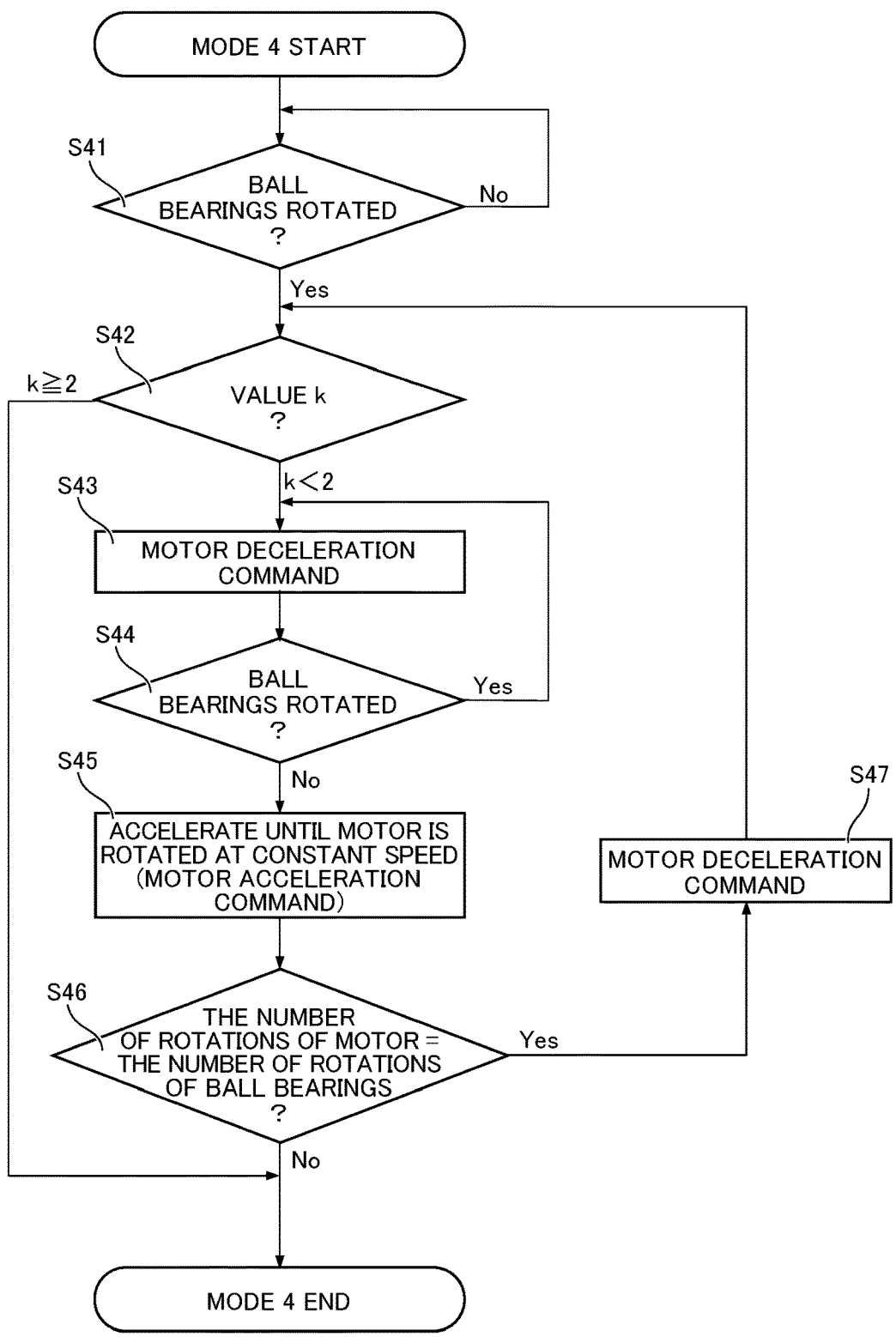
FIG. 11 is a flowchart illustrating a fourth mode of the motor control system.

FIG. 1 is a perspective view of a fan instrument B using the motor 100 which serves as the first embodiment of the present invention. FIG. 2A is a sectional side view as seen in reference numerals 2A-2A of FIG. 1, which illustrates rotation in a state where a motor shaft 120 and a sleeve 130 are separated from each other. FIG. 2B is a sectional side view of major parts as seen in reference numerals 2B-2B of FIG. 2A. FIGS. 3A and 3B are sectional side views respectively corresponding to FIGS. 2A and 2B, and illustrating rotation of the time when the sum of a rotation-time viscous friction torque Ta of a dynamic pressure gas bearing and a contact friction torque Tka possibly making damage to the dynamic pressure gas bearing by swinging contact between the motor shaft 100 and the sleeve 130 due to a certain external disturbance is a value greater than the sum of a friction torque Tb of ball bearings 171, 172 and a maximum torque $Td_{max}$ generated in a state where rotation of the ball bearings 171, 172 serving as auxiliary bearings is suppressed by a non-contact detent torque generation mechanism 180 at the time of suppressing the rotation, that is, $(Ta+Tka)>(Tb+Td_{max})$. FIG. 4A is a principle plan view illustrating a Hall sensor 191 which serves as a ball bearing rotation detecting means 190. FIG. 4B is a principle sectional side view as seen in reference numerals 4B-4B of FIG. 4A. FIG. 4C is a principle plan view illustrating a fluxgate pattern 192 which serves as the ball bearing rotation detecting means 190. FIG. 4D is a principle sectional side view as seen in reference numerals 4D-4D of FIG. 4C. FIG. 4E is a principle plan view illustrating an eddy current sensor 193 which serves as the ball bearing rotation detecting means 190. FIG. 4F is a principle sectional side view as seen in reference numerals 4F-4F of FIG. 4E. FIG. 5 is a diagram illustrating a change in the number of rotations of the dynamic pressure gas bearing and a change in the number of rotations of the ball bearings 171, 172 before and after the swinging contact between the motor shaft 120 and the sleeve 130. FIG. 6A is a diagram illustrating a relationship between the rotation-time viscous friction torque Ta of the dynamic pressure gas bearing and the friction torque Tb of the ball bearings 171, 172, and the number of rotations. FIG. 6B is a diagram illustrating a relationship between the number of rotations N of an impeller W (motor), and the number of rotations Na of the dynamic pressure gas bearing and the number of rotations Nb of the ball bearings 171, 172. FIG. 7 is a schematic block diagram of the motor control system MS using the motor 100 which serves as the first embodiment of the present invention. FIG. 8 is a flowchart illustrating a first mode of the motor control system MS. FIG. 9 is a flowchart illustrating a second mode of the motor control system MS. FIG. 10 is a flowchart illustrating a third mode of the motor control system MS. FIG. 11 is a flowchart illustrating a fourth mode of the motor control system MS.

As illustrated in FIGS. 1 and 2A, 2B, the fan instrument B serving as the first embodiment of the present invention includes the motor 100, a hub H, the impeller W, an air suction inlet I, an air exhaustion outlet E, and a cover plate C.

The motor 100 of the first embodiment is a sleeve rotation-type motor in which the sleeve 130 is rotated with respect to the motor shaft 120 in a motor case body 110. The hub H is integrally fitted to the sleeve 130 serving as a rotor.

The impeller W is integrally fitted to the sleeve 130 via the hub H, and the motor shaft 120 is rotatably inserted into the impeller W.

The air suction inlet I is provided in a central upper part of the motor case body 110 of the motor 100 in FIG. 1, and the air exhaustion outlet E is provided in a side part of the motor case body 110. By rotating the impeller W at high speed, the external air is suctioned into an internal impeller chamber via the air suction inlet I, and hence pressure in the impeller chamber is boosted. The air in the impeller chamber is then exhausted from the air exhaustion outlet E.

The cover plate C is arranged on the upper side of the air suction inlet I so as to be spaced from the air suction inlet in FIG. 1, and configured to prevent entry of foreign matters and the like.

Next, the motor 100 will be described in detail. The motor 100 includes the motor case body 110, the motor shaft 120, the sleeve 130, a rotor magnet 140, a drive coil 150 that generates a magnetic force via energization, a yoke 160 serving as an insulation core, the ball bearings 171, 172 serving as the auxiliary bearings, and the non-contact detent torque generation mechanism 180 that suppresses the rotation of the ball bearings 171, 172. The sleeve 130 is installed around the motor shaft 120 with a tiny clearance. A part of the sleeve facing this tiny clearance serves as the dynamic pressure gas bearing.

By forming, for example, herringbone grooves on one of an inner circumferential surface of the sleeve 130 and an outer circumferential surface of the motor shaft 120, a dynamic pressure is generated between the outer circumferential surface of the motor shaft 120 and the inner circumferential surface of the sleeve 130 upon relative rotation, so that bearing rigidity is provided.

The rotor magnet 140 is formed by a permanent magnet and fitted to an outer circumference of the sleeve 130, so as to be rotated integrally with the sleeve 130.

The drive coil 150 is arranged as a stator at a position in an outer circumference of the rotor magnet 140, the position facing the rotor magnet 140, and attached to a base plate 151, so as to generate the magnetic force via energization.

The yoke 160 is installed in an outer circumference of the drive coil 150, and has an effect of increasing the magnetic force of the drive coil 150.

The two ball bearings 171, 172 serving as the auxiliary bearings are arranged in series with the sleeve 130 serving as part of the dynamic pressure gas bearing in a path through which a torque is transmitted. Specifically, the ball bearing 171 is held by a bearing holder 173 and rotatably supports an upper end of the motor shaft 120 in FIG. 2A.

The bearing holder 173 is attached to the motor case body 110 via a vibration absorbing O-ring 177 made of an elastic material. The vibration absorbing O-ring 177 also has a function of pressurizing the bearing holder 173. Similarly, the ball bearing 172 is held by a bearing holder 174 and rotatably supports a lower end side part of the motor shaft 120 in FIG. 2A. The bearing holder 174 is attached to the motor case body 110 via a vibration absorbing O-ring 178 made of an elastic material. The vibration absorbing O-ring 178 also has a function of pressurizing the bearing holder 174.

The non-contact detent torque generation mechanism 180 is arranged in parallel to the ball bearings 171, 172 serving as the auxiliary bearings in the path through which the torque is transmitted. Specifically, the non-contact detent torque generation mechanism 180 includes a movable-side annular magnet 181 serving as a rotation-side magnet to be rotated integrally with the motor shaft 120, the rotation-side magnet whose poles are switched in the circumferential direction and a fixed-side annular magnet 182 serving as a fixed-side magnet arranged on the outer circumferential side of the movable-side annular magnet 181, the fixed-side magnet whose poles are switched in the circumferential direction.

The movable-side annular magnet 181 is fitted to a lower end side part of the motor shaft 120 in FIG. 2A in the vicinity of the upper side of the ball bearing 172 so as to be rotated integrally with the motor shaft 120. The fixed-side annular magnet 182 is attached to the motor case body 110 at a position facing the movable-side annular magnet 181. By an attraction force acting between the movable-side annular magnet 181 and the fixed-side annular magnet 182, the rotation of the ball bearings 171, 172 is suppressed.

An inner thrust magnet 175 is fitted to an upper end side part of the motor shaft 120 so as to be rotated integrally with the motor shaft 120. An outer thrust magnet 176 is installed at a position facing the inner thrust magnet 175 on the outer circumferential side of the inner thrust magnet so as to be rotated integrally with the hub H. By an attraction force acting between the inner thrust magnet 175 and the outer thrust magnet 176, a relative positional relationship between the motor shaft 120 and the sleeve 130 in the thrust direction is stabilized.

Further, in the present invention, the ball bearing rotation detecting means 190 serving as a rotation detecting means that detects the rotation of the ball bearings 171, 172 is installed inside the motor case body 110.

As illustrated in FIGS. 2B, 3B, 4A, 4B, the ball bearing rotation detecting means 190 may be formed by, for example, the movable-side annular magnet 181 of two-pole magnetization and the Hall sensor 191 installed in the base plate 151 at a position facing this movable-side annular magnet 181. By detecting a change in the Hall voltage upon rotation of the movable-side annular magnet 181 and a subsequent change in a magnetic force thereof into a sinusoidal waveform, by utilizing the so-called Hall effect, the rotation of the ball bearings 171, 172 is detected.

As illustrated in FIGS. 4C, 4D, the ball bearing rotation detecting means 190 may be formed by, for example, the fluxgate pattern 192 of for example 18 poles printed on the base plate 151 and the movable-side annular magnet (181) having the same number of magnetization poles as the number of this fluxgate pattern 192. By detecting a change in inductance upon the rotation of the movable-side annular magnet 181, the rotation of the ball bearings 171, 172 is detected.

Further, as illustrated in FIGS. 4E, 4F, the ball bearing rotation detecting means 190 may be formed by, for example, a metal recess and projection portion 194 to be rotated integrally with the movable-side annular magnet 181 and an eddy current sensor 193 installed to face this metal recess and projection portion 194. An outer circumferential surface of the metal recess and projection portion 194 is formed in a recessed and projected shape. By detecting a change in an eddy current magnetic field (a change in the amplitude and the phase of detected coil inductor voltage) upon rotation of the metal recess and projection portion 194, the rotation of the ball bearings 171, 172 is detected. The ball bearing rotation detecting means 190 has not only the configuration that the magnetic change by the rotation is detected but also other known configurations such as a configuration that an optical change by rotation is detected. The ball bearing rotation detecting means is not necessarily arranged in the motor case body as a matter of course.

When the magnetic force is generated by energizing the drive coil 150 and a rotational force is generated in cooperation with the rotor magnet 140, as illustrated by a bold one-chain line of FIG. 2A, the sleeve 130, the rotor magnet 140, the hub H, the impeller W, and the outer thrust magnet 176 are rotated as a first rotor. The sum of the friction torque Tb of the ball bearings 171, 172 and the maximum torque $Td_{max}$ generated by the non-contact detent torque generation mechanism 180 upon suppressing the rotation of the ball bearings 171, 172 is set to be a value greater than the rotation-time viscous friction torque Ta of the dynamic pressure gas bearing in a state where the motor shaft 120 and the sleeve 130 are separated from each other, that is, $(Tb+Td_{max})>(Ta)$. Thus, the motor shaft 120 is not rotated in this state.

When an external disturbance is added to the motor 100 for some reasons and the motor shaft 120 and the sleeve 130 relatively swing and are brought into contact with each other, a contact friction torque Tsa is generated in the dynamic pressure gas bearing. In a case where this contact friction torque Tsa reaches a contact friction torque Tka possibly making damage to the dynamic pressure gas bearing, the value of the maximum torque $Td_{max}$ generated by the non-contact detent torque generation mechanism 180 which is provided for suppressing the rotation of the ball bearings 171, 172 serving as the auxiliary bearings is set to obtain the relationship of $(Ta+Tka)>(Tb+Td_{max})$. Thus, as illustrated in FIGS. 3A, 5, before seizure such as adhesion or galling is generated in the dynamic pressure gas bearing, the fact that the contact friction torque Tsa of the dynamic pressure gas bearing is equal to Tka is transmitted to the ball bearings 171, 172, and the ball bearings 171, 172 start the rotation as well.

That is, as illustrated by a bold double-chain line of FIG. 3A, inner diameter side parts of the ball bearings 171, 172, the movable-side annular magnet 181, and the inner thrust magnet 175 receive the contact friction torque Tka possibly making damage to the dynamic pressure gas bearing from the first rotor including the sleeve 130, the rotor magnet 140, the hub H, the impeller W, and the outer thrust magnet 176, and start rotation as a second rotor.

When the motor shaft 120 and the sleeve 130 are brought into contact with each other and in a case where the sum of the rotation-time viscous friction torque Ta of the dynamic pressure gas bearing and the contact friction torque Tsa of the dynamic pressure gas bearing is less than the sum of the friction torque Tb of the ball bearings 171, 172 and the maximum torque $Td_{max}$ generated by the non-contact detent torque generation mechanism 180 provided for suppressing the rotation of the ball bearings 171, 172, that is in a case of (Ta+Tsa)<(Tb+$Td_{max}$), which is (Tsa<Tka), the ball bearings 171, 172 are hardly rotated (the ball bearings may be rotated slightly at the instant of contact but not continuously rotated). Thus, as illustrated by the bold one-chain line of FIG. 2A, only the first rotor including the sleeve 130, the rotor magnet 140, the hub H, the impeller W, and the outer thrust magnet 176 continues to be rotated. This is because there is no possibility of making damage to the dynamic pressure gas bearing such as generating seizure.

As illustrated in FIG. 5, the sum of the rotation-time viscous friction torque Ta of the dynamic pressure gas bearing and the contact friction torque Tsa of the dynamic pressure gas bearing becomes the value greater than the sum of the friction torque Tb of the ball bearings 171, 172 and the maximum torque $Td_{max}$ generated by the non-contact detent torque generation mechanism 180 provided for suppressing the rotation of the ball bearings 171, 172, that is in a case of (Ta+Tsa)>(Tb+$Td_{max}$), which is (Tsa=Tka), the rotation of the ball bearings 171, 172 is started instantaneously, so that damage to the dynamic pressure gas bearing can be prevented, and a transition period in which both the dynamic pressure gas bearing and the ball bearings 171, 172 are brought into a stably rotated state is as short as several tens of seconds.

When the motor shaft 120 and the sleeve 130 are separated from each other again, the dynamic pressure gas bearing no more receives damage, and hence the contact friction torque Tsa becomes zero. Meanwhile, by relative rotation, the movable-side annular magnet 181 and the fixed-side annular magnet 182 repeat attraction and repulsion, and in accordance with a relative angle (position), a detent torque Td by the movable-side annular magnet 181 and the fixed-side annular magnet 182 is changed in a sinusoidal waveform. However, since an average detent torque for one rotation after the ball bearings 171, 172 start the rotation is zero, a substantive loss is not generated. When the rotation-time viscous friction torque Ta of the dynamic pressure gas bearing and the friction torque Tb of the ball bearings 171, 172 are balanced, the number of rotations Na of the sleeve 130 by the dynamic pressure gas bearing and the number of rotations Nb of the motor shaft 120 by the ball bearings 171, 172 become constant.

In the transition period, the number of rotations Na of the dynamic pressure gas bearing is reduced by generation of the contact friction torque Tka possibly making damage to the dynamic pressure gas bearing. On the other hand, the ball bearings 171, 172 start the rotation, and the number of rotations Nb is gradually increased until the sum of the rotation-time viscous friction torque Ta of the dynamic pressure gas bearing and the contact friction torque Tsa is balanced with the friction torque Tb of the ball bearings 171, 172, that is, (Ta+Tsa)=(Tb).

The number of rotations N of the impeller W (motor) is equal to the sum of the number of rotations Na of the dynamic pressure gas bearing and the number of rotations Nb of the ball bearings 171, 172, that is, in a relationship of (N=Na+Nb). As the number of rotations Na of the dynamic pressure gas bearing is reduced, the number of rotations Nb of the ball bearings 171, 172 is increased. As a result, the number of rotations N of the impeller W (motor) is hardly changed.

Even when the contact friction torque Tsa reaches the magnitude Tka which possibly makes damage to the dynamic pressure gas bearing and the rotation of the ball bearings 171, 172 is started, the average detent torque for one rotation of the movable-side annular magnet 181 and the fixed-side annular magnet 182 is zero and a substantive loss is not generated. Thus, even after transition, the number of rotations N of the impeller W (motor) is unchanged, and the number of rotations N of the impeller W (motor) becomes substantially constant before and after generation of the swinging contact.

As illustrated in FIG. 5, the number of rotations Na of the dynamic pressure gas bearing and the number of rotations Nb of the ball bearings 171, 172 after transition are respectively stabilized as the constant number of rotations. This is because the dynamic pressure gas bearing and the ball bearings 171, 172 have a relationship between the rotation-time viscous friction torque Ta of the dynamic pressure gas bearing and the friction torque Tb of the ball bearings 171, 172, and the number of rotations as illustrated in FIG. 6A. In other words, after transition, the rotation-time viscous friction torque Ta of the dynamic pressure gas bearing and the friction torque Tb of the ball bearings 171, 172 are balanced. Thus, the number of rotations Na and the number of rotations Nb become the number of rotations corresponding to the torques, respectively.

In the present invention, as described above, the ball bearing rotation detecting means 190 serving as the rotation detecting means that detects the rotation of the ball bearings 171, 172 is installed inside the motor case body 110. Thereby, in a case where the ball bearings 171, 172 start the rotation, the rotation of the ball bearings 171, 172 is detected. That is, a state change inside the motor 100 can be grasped.

In the present embodiment, the auxiliary bearings are formed by the ball bearings 171, 172 serving as one example of rolling bearings. Thus, there is no radical deterioration and seizure is not easily generated. That is, when the contact friction torque becomes the contact friction torque Tka possibly making damage to the dynamic pressure gas bearing ((Ta+Tka)>(Tb+$Td_{max}$)), the rotation of the ball bearings 171, 172 is surely started. Thereby, damage to the dynamic pressure gas bearing can be avoided in advance. In addition, since the ball bearings 171, 172 have such a structure that balls roll, seizure is not easily generated in the first place.

Further, in the present embodiment, the number of rotations Nb of the ball bearings 171, 172 when the magnitude of the friction torque Tb of the ball bearings 171, 172 and the magnitude of the rotation-time viscous friction torque Ta of the dynamic pressure gas bearing are balanced is smaller than the number of rotations Na of the dynamic pressure gas bearing. As a result, a relationship in which the dynamic pressure gas bearing serves as a major part and the ball bearings 171, 172 serve as auxiliary parts is maintained. Thus, the ball bearings 171, 172 are rotated while leaving extra room. Therefore, the life of the ball bearings is not remarkably shortened.

Next, a sequence of actions until the rotation of the auxiliary bearings is restored into a suppressed state will be described.

As illustrated by an arrow A1 of FIG. 6B, by energizing the drive coil 150, the rotation is started originally from a state where the first rotor including the sleeve 130, the rotor magnet 140, the hub H, the impeller W, and the outer thrust magnet 176 is stopped (state of FIG. 2A), and the number of rotations N of the impeller W (motor) is increased up to, for example, 80,000 r/min which is the predetermined number of rotations. In other words, the number of rotations N of the impeller W (motor) is increased up to 80,000 r/min which is the predetermined number of rotations from a state where the impeller is rotatably supported by the dynamic pressure gas bearing and stopped.

When the external disturbance is added to the motor 100 for some reasons, the motor shaft 120 and the sleeve 130 relatively swing and are brought into contact with each other, and the contact friction torque Tsa of the dynamic pressure gas bearing is generated and increased, the sum of the rotation-time viscous friction torque Ta of the dynamic pressure gas bearing and the contact friction torque Tsa=Tka becomes the value greater than the sum of the friction torque Tb of the ball bearings 171, 172 and the maximum torque $Td_{max}$ generated by the non-contact detent torque generation mechanism 180 in a state where the rotation of the ball bearings 171, 172 is suppressed ((Ta+Tka)>(Tb+$Td_{max}$)) before seizure such as adhesion or galling is generated in the dynamic pressure gas bearing.

Then, the contact friction torque Tka possibly making damage to the dynamic pressure gas bearing is transmitted to the ball bearings 171, 172, and the rotation of the ball bearings 171, 172 is started. At the same time, as illustrated by an arrow A2, the number of rotations Na of the dynamic pressure gas bearing is reduced to 51,000 r/min, and at the same time, as illustrated by an arrow B2, the number of rotations Nb of the ball bearings 171, 172 is increased up to 29,000 r/min (state of FIG. 3A).

The first rotor and the second rotor may be rotated continuously in this state. However, the ball bearings 171, 172 serving as the auxiliary bearings are contact bearings. Thus, from a viewpoint of the life of the motor, the state is desirably brought back into the original state where only the first rotor is rotated.

By controlling energization of the drive coil 150, as illustrated by an arrow A3 and an arrow B3, the number of rotations N of the impeller W (motor) is reduced, so that the number of rotations Na of the dynamic pressure gas bearing and the number of rotations Nb of the ball bearings 171, 172 are reduced. At this time, the slope of curves of the number of rotations Na of the dynamic pressure gas bearing and the number of rotations Nb of the ball bearings 171, 172 illustrated in FIG. 6B is respectively changed in accordance with the relationship between the number of rotations and the friction torques illustrated in FIG. 6A.

That is, in a relationship where the rotation-time viscous friction torque Ta of the dynamic pressure gas bearing and the friction torque Tb of the ball bearings 171, 172 are balanced, the number of rotations Na of the dynamic pressure gas bearing and the number of rotations Nb of the ball bearings 171, 172 are reduced.

When the number of rotations N of the impeller W (motor) is reduced by controlling energization of the drivel coil 150 until at least the number of rotations Nb of the ball bearings 171, 172 becomes zero at A4, B4, the rotation of the ball bearings 171, 172 is suppressed again by the non-contact detent torque generation mechanism 180, and the state is restored into the original state where only the first rotor is rotated as illustrated in FIG. 2A.

Whether or not the number of rotations Nb of the ball bearings 171, 172 can be detected by the ball bearing rotation detecting means 190 as described above. According to need, by controlling energization of the drive coil 150, the number of rotations N of the impeller W (motor) is increased as illustrated by the arrow A1.

In addition to bringing into a state where only the first rotor is rotated by reducing the number of rotations N of the impeller W (motor) by controlling energization of the drive coil 150 as illustrated by the arrow A3 and the arrow B3, the impeller W (motor) may be rotated again as illustrated by the arrow A1 after completely stopping the impeller W. Further, in a case where the non-contact detent torque generation mechanism 180 is not permanent magnets but electromagnets, the number of rotations Nb of the ball bearings 171, 172 may be made zero by enhancing an attraction force of the electromagnets, and then the attraction force by the electromagnets may be brought back to the original magnitude.

The non-contact detent torque generation mechanism 180 can also be formed by a permanent magnet and then combined with a non-contact detent torque generation mechanism of an electromagnet (not shown) separately for braking the ball bearings 171, 172. In this case, only when the number of rotations Nb of the ball bearings 171, 172 is intended to be zero, an electromagnetic force is generated by the non-contact detent torque generation mechanism of the electromagnet (not shown). Thus, energization of the electromagnet can be efficiently suppressed to minimum.

Next, the motor control system MS using the motor 100 will be described.

As illustrated in FIG. 7, the motor control system MS includes the motor 100, a control unit CL, a drive circuit CT, a notification means AL, and a display means DP. Among them, the control unit CL is configured to control rotation of the motor 100 via the drive circuit CT. The control unit CL is also configured to receive a rotation detection signal from the ball bearing rotation detecting means 190. The drive circuit CT is configured to form, for example, an inverter circuit, and convert a rotation instruction from the control unit CL into a signal matching with the motor 100 and send a pulse signal serving as one example to the motor 100.

The notification means AL is configured to notify a user of the fact that the ball bearings 171, 172 are rotated or a replacement time for the motor 100 or the ball bearings 171, 172 on the basis of an instruction from the control unit CL by means of turning on a light, producing a notification sound, or the like.

The display means DP is configured to display the fact that the ball bearings 171, 172 are rotated or the fact that the replacement time for the motor 100 or the ball bearings 171, 172 would come soon on a display or the like on the basis of an instruction from the control unit CL. A signal may be outputted from the control unit CL to the exterior according to need. Thus, multi-purpose utilization such as centralized management of plural motors by inputting this externally outputted signal to an external control device (not shown) is also available.

As illustrated in FIG. 8, in Step S11 of the first mode, the control unit CL confirms that the ball bearings 171, 172 are not rotated based on whether or not the rotation detection signal is received from the ball bearing rotation detecting means 190. In Step S12, the dynamic pressure gas bearing is brought into swinging contact and the contact friction torque Tsa is generated. In Step S13, the control unit CL judges whether or not the ball bearings 171, 172 are rotated based on whether or not the rotation detection signal is received from the ball bearing rotation detecting means 190.

In a case where it is judged that the ball bearings are rotated, the flow advances to Step S14. On the other hand, in a case where it is judged that the ball bearings are not rotated, the flow returns to Step S11.

In Step S14, the control unit CL adds one as the number of times the rotation detection signal is received. In other words, the control unit executes count-up of the number of rotation start times of the ball bearings 171, 172.

In Step S15, the control unit CL determines whether or not the number of rotation start times reaches the predetermined number of times. The predetermined number of times is the number of times before the life of the ball bearings 171, 172 ends. Thus, proper safety factors are desirably provided in accordance with a use environment, a purpose, or the like.

In a case where it is determined that the number of rotation start times reaches the predetermined number of times, the flow advances to Step S16. On the other hand, in a case where it is determined that the number of rotation start times is less than the predetermined number of times, the first mode is finished.

In Step S16, the control unit CL instructs at least one of the notification means AL and the display means DP to notify of or display the fact that the replacement time for the motor 100 or the ball bearings 171, 172 comes. Then, the first mode is finished.

By the first mode, the life of the ball bearings 171, 172 can be calculated and predicted from the number of rotation start times. On the basis of this prediction of the life, the user can be informed of the replacement time for the motor 100 or the ball bearings 171, 172.

As illustrated in FIG. 9, in Step S21 of the second mode, the control unit CL judges whether or not the ball bearings 171, 172 are rotated based on whether or not the rotation detection signal is received from the ball bearing rotation detecting means 190.

In a case where it is judged that the ball bearings are rotated, the flow advances to Step S22. On the other hand, in a case where it is judged that the ball bearings are not rotated, the flow returns to Step S21. In Step S22, the control unit CL calculates an addition time during which the rotation detection signal is received from the ball bearing rotation detecting means 190.

In Step S23, the control unit CL compares the rotation addition time of the ball bearings and a predetermined set time before the life of the ball bearings 171, 172 ends. The predetermined set time is a rotation addition time before the life of the ball bearings 171, 172 ends, and proper safety factors are desirably provided in accordance with a use environment, a purpose, or the like.

In a case where it is determined that the rotation addition time of the ball bearings reaches the predetermined set time before the life of the ball bearings 171, 172 ends, the flow advances to Step S24.

In a case where it is determined that the rotation addition time of the ball bearings is less than the predetermined set time before the life of the ball bearings 171, 172 ends, the second mode is finished.

In Step S24, the control unit CL instructs at least one of the notification means AL and the display means DP to notify of or display the fact that the replacement time for the motor 100 or the ball bearings 171, 172 comes. Then, the second mode is finished.

By the second mode, the life of the ball bearings 171, 172 can be calculated and predicted from the rotation addition time. On the basis of this prediction of the life, the user can be informed of the replacement time for the motor 100 or the ball bearings 171, 172.

As illustrated in FIG. 10, in Step S31 of the third mode, the control unit CL judges whether or not the ball bearings 171, 172 are rotated based on whether or not the rotation detection signal is received from the ball bearing rotation detecting means 190.

In a case where it is judged that the ball bearings are rotated, the flow advances to Step S32. On the other hand, in a case where it is judged that the ball bearings are not rotated, the flow returns to Step S31.

In Step S32, the control unit CL measures a time after the rotation detection signal is received from the ball bearing rotation detecting means 190, and determines whether or not a predetermine time elapses. The predetermined time is a time set for transition from a state where the ball bearings 171, 172 are rotated to a state where the rotation is suppressed again. The predetermined time may be set as several seconds in a case where a time during which the ball bearings 171, 172 are rotated is to be as short as possible, or may be set as several minutes to several hours in a case where the ball bearings can be rotated for a long time to some extent. In such a way, the predetermined time can be appropriately set in accordance with a use environment, a purpose, or the like.

In a case where it is determined that the predetermine time elapses, the flow advances to Step S33. On the other hand, in a case where it is determined that the predetermined time does not elapse yet, the flow returns to Step S32.

In Step S33, the control unit CL reduces the number of rotations of the motor 100. In Step S34, the control unit CL judges whether or not the ball bearings 171, 172 are rotated based on whether or not the rotation detection signal is received from the ball bearing rotation detecting means 190.

In a case where it is judged that the ball bearings are rotated, the flow returns to Step S33. On the other hand, in a case where it is judged that the ball bearings are not rotated, that is, in a case where it is judged that the auxiliary bearings reach a state where the rotation is suppressed again by the non-contact detent torque generation mechanism 180, the flow advances to Step S35.

In Step S35, the control unit CL increases the number of rotations of the motor 100. In Step S36, the control unit CL matches the number of rotations of the motor 100 with the original predetermined number of rotations, and the third mode is finished.

By the third mode, the rotation state and the number of rotations are restored into the rotation state and the number of rotations in which the rotation of the ball bearings 171, 172 is suppressed before the motor shaft 120 and the sleeve 130 are brought into swinging contact with each other.

As illustrated in FIG. 11, in Step S41 of the fourth mode, the control unit CL judges whether or not the ball bearings 171, 172 are rotated based on whether or not the rotation detection signal is received from the ball bearing rotation detecting means 190. In a case where it is judged that the ball bearings are rotated, the flow advances to Step S42. On the other hand, in a case where it is judged that the ball bearings are not rotated, the flow returns to Step S41.

In Step S42, the control unit CL compares a count value (value k) and a predetermined threshold value (threshold value=2 as one example).

In a case where it is determined that the count value reaches the predetermined threshold value, the fourth mode is finished. On the other hand, in a case where it is determined that the count value does not reach the predetermined threshold value, the flow advances to Step S43. In Step S43, the control unit CL reduced the number of rotations of the motor 100.

In Step S44, the control unit CL judges whether or not the ball bearings 171, 172 are rotated based on whether or not the rotation detection signal is received from the ball bearing rotation detecting means 190.

In a case where it is judged that the ball bearings are rotated, the flow returns to Step S43. On the other hand, in a case where it is judged that the ball bearings are not rotated, the flow advances to Step S45. In Step S45, the control unit CL increases (accelerates) the number of rotations until the number of rotations of the motor 100 becomes the predetermined number of rotations.

In Step S46, the control unit CL compares the number of rotations N of the impeller W and the number of rotations of the ball bearings 171, 172, and determines whether or not the numbers of rotations are equal to each other.

The number of rotations of the ball bearings 171, 172 is calculated by for example, a magnetic field change amount of the ball bearing rotation detecting means 190, that is, a magnetic field change per unit time.

In a case where it is determined that the numbers of rotations are equal to each other, the flow advances to Step S47. On the other hand, in a case where it is determined that the numbers of rotations are not equal to each other, the fourth mode is finished.

In Step S47, the control unit CL increases the count value by one. In Step S42 again, the control unit CL compares the count value (value k) and the predetermined threshold value (threshold value=2 as one example).

In a case where it is determined that the count value reaches the predetermined threshold value, it is judged as an abnormal state where seizure is generated in the dynamic pressure gas bearing, and the fourth mode is finished. On the other hand, in a case where it is determined that the count value does not reach the predetermined threshold value, the flow returns to Step S43.

By the fourth mode, whether or not seizure is generated can be judged by reducing the number of rotations of the motor 100 and testing the rotation only by the dynamic pressure gas bearing. When it is judged as an abnormal state where the dynamic pressure gas bearing cannot be rotated (seizure is generated), after informing of the fact that the dynamic pressure gas bearing is in an abnormal state, the motor 100 can be rotated only by the ball bearings 171, 172 as well.

In this case, since the number of rotations of the motor 100 is equal to the number of rotations of the ball bearings 171, 172, a time before the life of the ball bearings 171, 172 ends is shortened. Thus, by utilizing the rotation addition time described in the second mode and setting a rotation addition time before the life ends provided with further safety factors more than the second mode, replacement of the motor 100 is desirably early facilitated.

With the motor 100 serving as the first embodiment of the present invention obtained in such a way, the ball bearings 171, 172 serving as one example of the auxiliary bearings for the dynamic pressure gas bearing are arranged in series with the dynamic pressure gas bearing, and the non-contact detent torque generation mechanism 180 that suppresses the rotation of the ball bearings 171, 172 is arranged in parallel to the ball bearings 171, 172, when Ta denotes the rotation-time viscous friction torque of the dynamic pressure gas bearing in a state where the motor shaft 120 and the sleeve 130 are separated from each other, Tka denotes the contact friction torque possibly making damage to the dynamic pressure gas bearing by the swinging contact between the motor shaft 120 and the sleeve 130, Tb denotes the rotation friction torque of the ball bearings 171, 172, and $Td_{max}$ denotes the maximum torque generated in a state where the rotation of the ball bearings 171, 172 is suppressed by the non-contact detent torque generation mechanism 180, the value of $Td_{max}$ is set to obtain the following relationship: $(Ta+Tka)>(Tb+Td_{max})>(Ta)$, and the ball bearing rotation detecting means 190 is provided. Thereby, the rotation of the ball bearings 171, 172 can be informed.

Further, the non-contact detent torque generation mechanism 180 includes the movable-side annular magnet 181 serving as the rotation-side magnet whose poles are switched in the circumferential direction of the motor shaft 120 and the fixed-side annular magnet 182 serving as the fixed-side magnet arranged on the outer circumferential side of this movable-side annular magnet 181, the fixed-side magnet whose poles are switched in the circumferential direction. Thereby, a substantive loss by the detent torque Td when the ball bearings 171, 172 are rotated can be eliminated.

The auxiliary bearings are the ball bearings 171, 172 serving as one example of the rolling bearings. Thereby, when the motor shaft 120 and the sleeve 130 are brought into swinging contact with each other, and the sum of the rotation-time viscous friction torque Ta of the dynamic pressure gas bearing and the contact friction torque Tsa=Tka becomes the value greater than the sum of the friction torque Tb of the ball bearings 171, 172 and the maximum torque $Td_{max}$ generated by the non-contact detent torque generation mechanism 180 in a state where the rotation of the ball bearings 171, 172 is suppressed $((Ta+Tka)>(Tb+Td_{max}))$, that is, before seizure such as adhesion or galling is generated in the dynamic pressure gas bearing, the rotation of the ball bearings 171, 172 can be surely started.

In the motor control system MS serving as the first embodiment of the present invention, since the control unit CL receives the rotation detection signal from the ball bearing rotation detecting means 190, the control unit CL can grasp the rotation of the ball bearings 171, 172. Further, since the control unit CL gives a notification command to the notification means AL when receiving the rotation detection signal, the user can be informed of the rotation of the ball bearings 171, 172.

Since the control unit CL measures the rotation addition time of the ball bearings 171, 172 when receiving the rotation detection signal, the control unit CL can calculate and predict the life of the ball bearings 171, 172 from the rotation addition time. Further, since the control unit CL counts up the number of times the rotation detection signal is received, the control unit CL can calculate and predict the life of the ball bearings 171, 172 from the number of rotation start times.

Since the control unit CL reduces the number of rotations of the motor 100 after receiving the rotation detection signal until the rotation detection signal is disappeared and increases the number of rotations of the motor 100 after the rotation detection signal is disappeared, the rotation state and the number of rotations are restored into the rotation state and the number of rotations before the motor shaft 120 and the sleeve 130 are brought into swinging contact with each other. In such a way, the effects thereof are enormous.

Next, a fan instrument B using a motor 200 which serves as a second embodiment of the present invention will be described on the basis of FIGS. 12A and 12B.

Figure 12A:
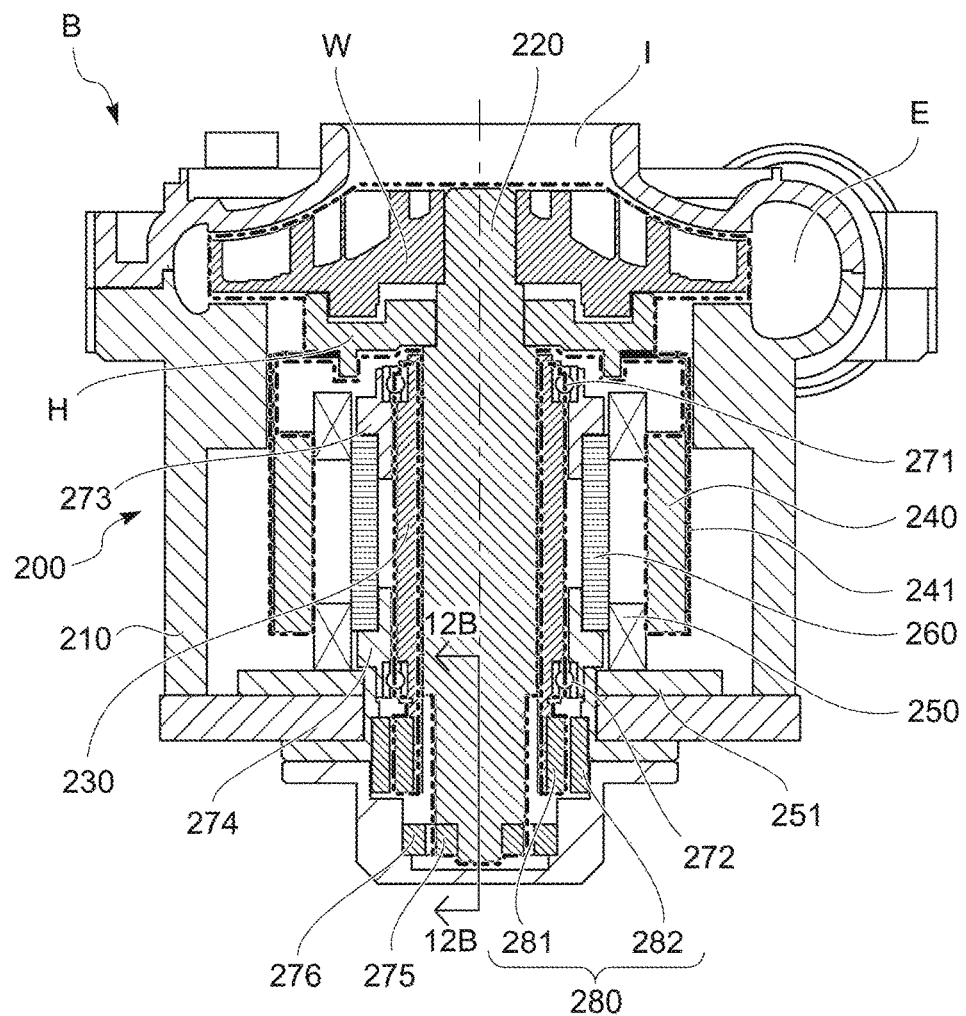
FIG. 12A is a sectional side view of a fan instrument using a motor which serves as a second embodiment of the present invention.

FIG. 12A is a sectional side view of the fan instrument B using the motor 200 which serves as the second embodiment of the present invention. FIG. 12B is a sectional side view of major parts as seen in reference numerals 12B-12B of FIG. 12A.

The motor 200 of the second embodiment is a shaft rotation-type motor which is modified from the sleeve rotation-type motor 100 of the first embodiment. Many elements of the motor 200 are common to those of the motor 100 of the first embodiment. Thus, the common matters will not be described in detail and will be simply identified with similar numbers in 200s.

In the motor 200 of the fan instrument B serving as the second embodiment of the present invention, as illustrated in FIG. 12A, the impeller W and the hub H are attached to be rotated integrally with a motor shaft 220. A rotor case 241 is arranged on the lower side of the hub H and configured to be rotated integrally with the motor shaft 220. On the inner circumferential side of the rotor case 241, a rotor magnet 240 is arranged and configured to be rotated integrally with the motor shaft 220.

On the inner circumferential side of the rotor magnet 240, a drive coil 250 is arranged as a stator. On the inner circumferential side of the drive coil 250, a yoke 260 is arranged. Ball bearings 271, 272 serving as auxiliary bearings are respectively held by bearing holders 273, 274, and the bearing holders 273, 274 are attached to the yoke 260. The ball bearings 271, 272 rotatably support a sleeve 230 with respect to the yoke 260 forming a stator. The sleeve 230 is provided around the motor shaft 220.

A movable-side annular magnet 281 serving as a rotation-side magnet of a non-contact detent torque generation mechanism 280 is arranged in an outer circumference of the sleeve 230 to be rotated integrally with the sleeve 230, and a fixed-side annular magnet 282 serving as a fixed-side magnet is attached to a motor case body 210.

An inner thrust magnet 275 is arranged in a lower end of the motor shaft 220 in FIG. 12A to be rotated integrally with the motor shaft 220. On the other hand, an outer thrust magnet 276 is attached to the motor case body 210 at a position facing the inner thrust magnet 275.

As illustrated by a bold one-chain line, the motor shaft 220, the impeller W, the hub H, and the inner thrust magnet 275 form the first rotor. As illustrated by a bold double-chain line, the sleeve 230, the movable-side annular magnet 281, and inner diameter side parts of the ball bearings 271, 272 form the second rotor.

Figure 12B:
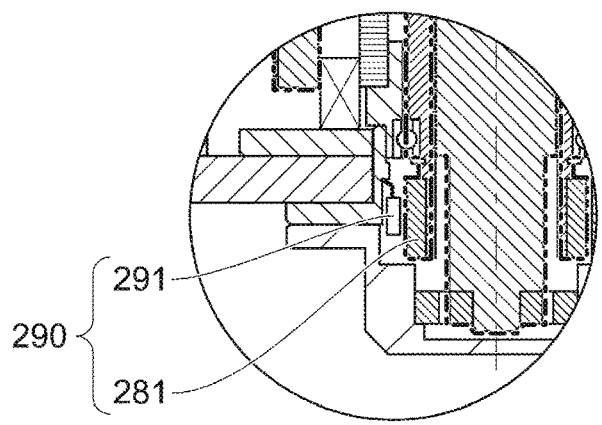
FIG. 12B is a sectional side view, taken on section plane 12B-12B of FIG. 12A, of the fan instrument using the motor which serves as the second embodiment of the present invention.

Further, as illustrated in FIG. 12B, a ball bearing rotation detecting means 290 may be formed by, for example, the movable-side annular magnet 281 of two-pole magnetization and a Hall sensor 291 installed in a base plate 251 at a position facing this movable-side annular magnet 281.

By detecting a change in the Hall voltage upon rotation of the movable-side annular magnet 281, by utilizing the so-called Hall effect, rotation of the ball bearings 271, 272 is detected. In such a way, even with the shaft rotation-type motor 200, operations and effects similar to the sleeve rotation-type motor of the first embodiment can be obtained.

The two embodiments show the example that the rotation-side magnet and the fixed-side magnet are arranged to face each other in the direction orthogonal to the rotation axis (radial direction). However, the magnets can also be arranged to face each other in the same direction as the rotation axis (axial direction). This is similar for the rotation detecting means.

The fixed-side magnet (permanent magnet) of the non-contact detent torque generation mechanism can be replaced with, for example, a magnetic member in which plural projecting portions are formed toward the rotation-side magnet as in gear teeth of an internal gear.

The invention claimed is:

1. A motor comprising:
   a motor case body;
   a motor shaft supported rotatably with respect to the motor case body;
   a drive coil arranged in the motor case body, the drive coil that generates a magnetic force via energization;
   a rotor magnet that generates a rotational force by utilizing an attraction/repulsion force acting between the drive coil and the rotor magnet; and
   a dynamic pressure gas bearing having a sleeve which covers a circumference of the motor shaft,
   the motor further comprising:
   auxiliary bearings arranged in series with the dynamic pressure gas bearing, the auxiliary bearings rotatably supporting the motor shaft; and
   a non-contact detent torque generation mechanism arranged in parallel to the auxiliary bearings, the non-contact detent torque generation mechanism that suppresses rotation of the auxiliary bearings, wherein
   when Ta denotes a rotation-time viscous friction torque of the dynamic pressure gas bearing in a state where the motor shaft and the sleeve are separated from each other, Tka denotes a contact friction torque possibly making damage to the dynamic pressure gas bearing by swinging contact between the motor shaft and the sleeve, Tb denotes a rotation friction torque of the auxiliary bearings, and $Td_{max}$ denotes a maximum torque generated in a state where the rotation of the auxiliary bearings is suppressed by the non-contact detent torque generation mechanism, the value of $Td_{max}$ is set to obtain the following relationship:

$$(Ta+Tka)>(Tb+Td_{max})>(Ta), \text{ and}$$

a rotation detecting means that detects the rotation of the auxiliary bearings is provided.

2. The motor according to claim 1, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction.

3. The motor according to claim 1, wherein the auxiliary bearings are rolling bearings.

4. A motor control system comprising a motor and a control unit that controls rotation of the motor, wherein the motor comprises:
   a motor case body;
   a motor shaft supported rotatably with respect to the motor case body;
   a drive coil arranged in the motor case body, the drive coil that generates a magnetic force via energization;
   a rotor magnet that generates a rotational force by utilizing an attraction/repulsion force acting between the drive coil and the rotor magnet; and a dynamic pressure gas bearing having a sleeve which covers a circumference of the motor shaft, the motor further comprising:

auxiliary bearings arranged in series with the dynamic pressure gas bearing, the auxiliary bearings rotatably supporting the motor shaft; and a non-contact detent torque generation mechanism arranged in parallel to the auxiliary bearings, the non-contact detent torque generation mechanism that suppresses rotation of the auxiliary bearings, wherein when Ta denotes a rotation-time viscous friction torque of the dynamic pressure gas bearing in a state where the motor shaft and the sleeve are separated from each other, Tka denotes a contact friction torque possibly making damage to the dynamic pressure gas bearing by swinging contact between the motor shaft and the sleeve, Tb denotes a rotation friction torque of the auxiliary bearings, and $Td_{max}$ denotes a maximum torque generated in a state where the rotation of the auxiliary bearings is suppressed by the non-contact detent torque generation mechanism, the value of $Td_{max}$ is set to obtain the following relationship:

$$(Ta+Tka)>(Tb+Td_{max})>(Ta), \text{ and}$$

a rotation detecting means that detects the rotation of the auxiliary bearings is provided; and wherein the control unit receives a rotation detection signal from the rotation detecting means.

5. The motor control system according to claim 4, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction.

6. The motor control system according to claim 4, wherein, when receiving the rotation detection signal from the rotation detecting means, the control unit issues a notification command to a notification means.

7. The motor control system according to claim 4, wherein:

the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction; and when receiving the rotation detection signal from the rotation detecting means, the control unit issues a notification command to a notification means.

8. The motor control system according to claim 4, wherein, when receiving the rotation detection signal, the control unit measures a rotation addition time of the auxiliary bearings.

9. The motor control system according to claim 4, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction, and wherein, when receiving the rotation detection signal, the control unit measures a rotation addition time of the auxiliary bearings.

10. The motor control system according to claim 4, wherein, when receiving the rotation detection signal from the rotation detecting means, the control unit issues a notification command to a notification means, and wherein, when receiving the rotation detection signal, the control unit measures a rotation addition time of the auxiliary bearings.

11. The motor control system according to claim 4, wherein:

the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction;

when receiving the rotation detection signal from the rotation detecting means, the control unit issues a notification command to a notification means; and when receiving the rotation detection signal, the control unit measures a rotation addition time of the auxiliary bearings.

12. The motor control system according to claim 4, wherein the control unit counts up the number of times the rotation detection signal is received.

13. The motor control system according to claim 4, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction, and wherein the control unit counts up the number of times the rotation detection signal is received.

14. The motor control system according to claim 4, wherein, when receiving the rotation detection signal from the rotation detecting means, the control unit issues a notification command to a notification means, and wherein the control unit counts up the number of times the rotation detection signal is received.

15. The motor control system according to claim 4, wherein:

the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction;

when receiving the rotation detection signal from the rotation detecting means, the control unit issues a notification command to a notification means; and wherein the control unit counts up the number of times the rotation detection signal is received.

16. The motor control system according to claim 4, wherein, when receiving the rotation detection signal, the control unit measures a rotation addition time of the auxiliary bearings, and wherein the control unit counts up the number of times the rotation detection signal is received.

17. The motor control system according to claim 4, wherein the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction; wherein, when receiving the rotation detection signal, the control unit measures a rotation addition time of the auxiliary bearings; and wherein the control unit counts up the number of times the rotation detection signal is received.

18. The motor control system according to claim 4, wherein, when receiving the rotation detection signal from the rotation detecting means, the control unit issues a notification command to a notification means; wherein, when receiving the rotation detection signal, the control unit measures a rotation addition time of the auxiliary bearings; and wherein the control unit counts up the number of times the rotation detection signal is received.

19. The motor control system according to claim 4, wherein:
   the non-contact detent torque generation mechanism includes a rotation-side magnet to be rotated integrally with the motor shaft, the rotation-side magnet whose poles are switched in the circumferential direction, and a fixed-side magnet arranged to face the rotation-side magnet on the outer circumferential side of the rotation-side magnet or in the axial direction of the rotation-side magnet, the fixed-side magnet whose poles are switched in the circumferential direction;
   when receiving the rotation detection signal from the rotation detecting means, the control unit issues a notification command to a notification means;
   when receiving the rotation detection signal, the control unit measures a rotation addition time of the auxiliary bearings; and
   the control unit counts up the number of times the rotation detection signal is received.

20. The motor control system according to claim 4, wherein;
   the control unit counts up the number of times the rotation detection signal is received; and
   the control unit reduces the number of rotations of the motor after receiving the rotation detection signal until the rotation detection signal is not received any more, and increases the number of rotations of the motor after the rotation detection signal is not received any more to restore the number of rotations into a state where the rotation of the auxiliary bearings is suppressed.

* * * * *